(12) United States Patent
Senderov et al.

(10) Patent No.: US 9,376,324 B2
(45) Date of Patent: Jun. 28, 2016

(54) INTRODUCTION OF MESOPOROSITY INTO ZEOLITE MATERIALS WITH SEQUENTIAL ACID, SURFACTANT, AND BASE TREATMENT

(71) Applicant: Rive Technology, Inc., Boston, MA (US)

(72) Inventors: Ernest Senderov, Westampton, NJ (US); Mohammad Ibrahim Qureshi, Princeton, NJ (US)

(73) Assignee: Rive Technology, Inc., Monmouth Junction, NJ (US)

( * ) Notice: Subject to any disclaimer, the term of this patent is extended or adjusted under 35 U.S.C. 154(b) by 651 days.

(21) Appl. No.: 13/740,916

(22) Filed: Jan. 14, 2013

(65) Prior Publication Data

US 2013/0183231 A1    Jul. 18, 2013

Related U.S. Application Data

(60) Provisional application No. 61/586,457, filed on Jan. 13, 2012.

(51) Int. Cl.

| | |
|---|---|
| *B01J 29/06* | (2006.01) |
| *C01B 39/02* | (2006.01) |
| *B01J 29/04* | (2006.01) |
| *B01J 29/18* | (2006.01) |
| *B01J 29/08* | (2006.01) |
| *B01J 29/70* | (2006.01) |
| *B01J 29/40* | (2006.01) |
| *B01J 35/10* | (2006.01) |

(52) U.S. Cl.
CPC .............. *C01B 39/026* (2013.01); *B01J 29/04* (2013.01); *B01J 29/041* (2013.01); *B01J 29/08* (2013.01); *B01J 29/082* (2013.01); *B01J 29/084* (2013.01); *B01J 29/18* (2013.01); *B01J 29/40* (2013.01); *B01J 29/7015* (2013.01); *B01J 35/10* (2013.01); *B01J 35/109* (2013.01); *B01J 35/1042* (2013.01); *B01J 35/1057* (2013.01); *B01J 35/1061* (2013.01); *B01J 2229/22* (2013.01); *B01J 2229/37* (2013.01)

(58) Field of Classification Search
USPC ........ 502/60, 63, 64, 71, 77, 78, 79; 423/700, 423/716
See application file for complete search history.

(56) References Cited

U.S. PATENT DOCUMENTS

| | | | |
|---|---|---|---|
| 3,709,853 A | 1/1973 | Karapinka | |
| 3,864,280 A | 2/1975 | Schneider | |
| 4,016,218 A | 4/1977 | Haag et al. | |
| 4,088,671 A | 5/1978 | Kobylinski | |
| 4,196,182 A | 4/1980 | Willermet et al. | |
| 4,205,055 A | 5/1980 | Maire et al. | |
| 4,263,268 A | 4/1981 | Knox et al. | |
| 4,318,824 A | 3/1982 | Turner | |
| 4,439,349 A | 3/1984 | Everett et al. | |
| 4,564,207 A | 1/1986 | Russ et al. | |
| 4,609,972 A | 9/1986 | Edeling et al. | |
| 4,637,623 A | 1/1987 | Bubik | |
| 4,689,314 A | 8/1987 | Martinez et al. | |
| 4,704,375 A | 11/1987 | Martinez et al. | |
| 4,761,272 A | 8/1988 | Hucke | |
| 4,775,655 A | 10/1988 | Edwards et al. | |
| 4,806,689 A | 2/1989 | Gier et al. | |
| 4,816,135 A | 3/1989 | Martinez et al. | |
| 4,836,737 A | 6/1989 | Holmes et al. | |
| 4,857,494 A | 8/1989 | Martinez et al. | |
| 4,891,458 A | 1/1990 | Innes et al. | |
| 4,894,215 A | 1/1990 | Kawakubo et al. | |
| 4,894,354 A | 1/1990 | Martinez et al. | |
| 4,968,405 A | 11/1990 | Wachter | |
| 5,013,699 A | 5/1991 | Vassilakis et al. | |
| 5,051,385 A | 9/1991 | Wachter | |
| 5,057,296 A | 10/1991 | Beck | |
| 5,061,147 A | 10/1991 | Nespor | |
| 5,095,169 A | 3/1992 | Skeels et al. | |
| 5,102,643 A | 4/1992 | Kresge et al. | |
| 5,116,794 A | 5/1992 | Skeels et al. | |
| 5,134,242 A | 7/1992 | Le et al. | |
| 5,134,243 A | 7/1992 | Bhore et al. | |
| 5,160,033 A | 11/1992 | Vassilakis et al. | |
| 5,200,058 A | 4/1993 | Beck et al. | |
| 5,207,892 A | 5/1993 | Vassilakis et al. | |

(Continued)

FOREIGN PATENT DOCUMENTS

| | | |
|---|---|---|
| JP | 2002128517 | 5/2002 |
| JP | 2004143026 | 5/2004 |
| WO | 0117901 | 3/2001 |
| WO | 0138223 | 5/2001 |
| WO | 2005102964 | 11/2005 |
| WO | 2006031259 | 3/2006 |
| WO | 2006/038912 | 4/2006 |

OTHER PUBLICATIONS

Al-Khattaf, S. et al., The Role of Diffusion in Alkyl-Benzenes Catalytic Cracking, Appl. Catal. A: Gen. 226; 139-153, (2002).

(Continued)

*Primary Examiner* — Elizabeth Wood

(74) *Attorney, Agent, or Firm* — Hovey Williams LLP

(57) ABSTRACT

Compositions and methods for introducing mesoporosity into zeolitic materials employing sequential acid, surfactant, and base treatments are disclosed herein. Mesopores can be introduced into zeolitic materials, such as zeolites, by treatment with an acid and surfactant followed by treatment with a base. The resulting mesoporous zeolitic materials can have a total 20 to 135 Å diameter mesopore volume of at least 0.05 cc/g. Additionally, the resulting mesoporous zeolitic materials can have a total 0 to 20 Å micropore volume of at least 0.10 cc/g.

31 Claims, 12 Drawing Sheets

(56) References Cited

U.S. PATENT DOCUMENTS

| | | | |
|---|---|---|---|
| 5,208,197 A | 5/1993 | Vassilakis et al. |
| 5,221,648 A | 6/1993 | Wachter |
| 5,232,580 A | 8/1993 | Le et al. |
| 5,254,327 A | 10/1993 | Martinez et al. |
| 5,256,277 A | 10/1993 | Del Rosi et al. |
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,360,774 A | 11/1994 | Martinez et al. |
| 5,391,433 A | 2/1995 | Kawakubo et al. |
| 5,393,718 A | 2/1995 | Skeels et al. |
| 5,401,384 A | 3/1995 | Martinez et al. |
| 5,458,929 A | 10/1995 | Earls et al. |
| 5,510,431 A | 4/1996 | Earls et al. |
| 5,538,710 A | 7/1996 | Guo et al. |
| 5,601,798 A | 2/1997 | Cooper et al. |
| 5,614,453 A | 3/1997 | Occelli |
| 5,628,978 A | 5/1997 | Tejada et al. |
| 5,636,437 A | 6/1997 | Kaschmitter et al. |
| 5,659,099 A | 8/1997 | Skeels et al. |
| 5,662,965 A | 9/1997 | Deguchi et al. |
| 5,672,556 A | 9/1997 | Pinnavaia et al. |
| 5,712,402 A | 1/1998 | Pinnavaia et al. |
| 5,744,673 A | 4/1998 | Skeels et al. |
| 5,770,040 A | 6/1998 | Tejada et al. |
| 5,785,946 A | 7/1998 | Pinnavaia et al. |
| 5,786,294 A | 7/1998 | Sachtler et al. |
| 5,795,559 A | 8/1998 | Pinnavaia et al. |
| 5,800,800 A | 9/1998 | Pinnavaia et al. |
| 5,800,801 A | 9/1998 | Tejada |
| 5,840,264 A | 11/1998 | Pinnavaia et al. |
| 5,840,271 A | 11/1998 | Carrazza et al. |
| 5,849,258 A | 12/1998 | Lujano et al. |
| 5,855,864 A | 1/1999 | Pinnavaia et al. |
| 5,858,457 A | 1/1999 | Brinker et al. |
| 5,892,080 A | 4/1999 | Alberti et al. |
| 5,902,564 A | 5/1999 | Lujano et al. |
| 5,952,257 A | 9/1999 | Tejada et al. |
| 5,958,367 A | 9/1999 | Ying et al. |
| 5,958,624 A | 9/1999 | Frech et al. |
| 5,961,817 A | 10/1999 | Wachter et al. |
| 5,985,356 A | 11/1999 | Schultz et al. |
| 5,993,768 A | 11/1999 | Zappelli et al. |
| 6,004,617 A | 12/1999 | Schultz et al. |
| 6,015,485 A | 1/2000 | Shukis et al. |
| 6,022,471 A | 2/2000 | Wachter et al. |
| 6,024,899 A | 2/2000 | Peng et al. |
| 6,027,706 A | 2/2000 | Pinnavaia et al. |
| 6,087,044 A | 7/2000 | Iwase et al. |
| 6,096,828 A | 8/2000 | DePorter et al. |
| 6,106,802 A | 8/2000 | Lujano et al. |
| 6,139,721 A | 10/2000 | Baldiraghi et al. |
| 6,162,414 A | 12/2000 | Pinnavaia et al. |
| 6,193,943 B1 | 2/2001 | Pinnavaia et al. |
| 6,204,424 B1 | 3/2001 | Yadav et al. |
| 6,248,691 B1 | 6/2001 | Gadkaree et al. |
| 6,297,293 B1 | 10/2001 | Bell et al. |
| 6,299,855 B1 | 10/2001 | Lujano et al. |
| 6,319,872 B1 | 11/2001 | Manzer et al. |
| 6,334,988 B1 | 1/2002 | Gallis et al. |
| 6,391,278 B1 | 5/2002 | Pinnavaia et al. |
| 6,410,473 B1 | 6/2002 | Pinnavaia et al. |
| 6,413,489 B1 | 7/2002 | Ying et al. |
| 6,413,902 B1 | 7/2002 | Pinnavaia et al. |
| 6,419,820 B1 | 7/2002 | Bogdan et al. |
| 6,476,085 B2 | 11/2002 | Manzer et al. |
| 6,476,275 B2 | 11/2002 | Schmidt et al. |
| 6,485,702 B1 | 11/2002 | Lujano et al. |
| 6,489,168 B1 | 12/2002 | Wang et al. |
| 6,495,487 B1 | 12/2002 | Bogdan |
| 6,515,845 B1 | 2/2003 | Oh et al. |
| 6,524,470 B1 | 2/2003 | Kasztelan et al. |
| 6,538,169 B1 | 3/2003 | Pittman et al. |
| 6,541,539 B1 | 4/2003 | Yang et al. |
| 6,544,923 B1 | 4/2003 | Ying et al. |
| 6,548,440 B1 | 4/2003 | Pham et al. |
| 6,558,647 B2 | 5/2003 | Lacombe et al. |
| 6,580,003 B2 | 6/2003 | Deng et al. |
| 6,583,186 B2 | 6/2003 | Moore, Jr. |
| 6,585,948 B1 | 7/2003 | Ryoo |
| 6,585,952 B1 | 7/2003 | Pinnavaia et al. |
| 6,592,764 B1 | 7/2003 | Stucky et al. |
| 6,620,402 B2 | 9/2003 | Jacobsen et al. |
| 6,623,967 B1 | 9/2003 | Willson, III |
| 6,649,413 B1 | 11/2003 | Schultz et al. |
| 6,656,443 B2 | 12/2003 | Klett |
| 6,669,924 B1 | 12/2003 | Kaliaguine et al. |
| 6,689,336 B2 | 2/2004 | Kanno |
| 6,702,993 B2 | 3/2004 | Pinnavaia et al. |
| 6,706,169 B2 | 3/2004 | Pinnavaia et al. |
| 6,706,659 B2 | 3/2004 | Gillespie et al. |
| 6,710,003 B2 | 3/2004 | Jan et al. |
| 6,746,659 B2 | 6/2004 | Pinnavaia et al. |
| 6,756,515 B2 | 6/2004 | Rende et al. |
| 6,762,143 B2 | 7/2004 | Shan et al. |
| 6,770,258 B2 | 8/2004 | Pinnavaia et al. |
| 6,793,911 B2 | 9/2004 | Koegler et al. |
| 6,797,153 B1 | 9/2004 | Fukuyama et al. |
| 6,797,155 B1 | 9/2004 | Chester et al. |
| 6,800,266 B2 | 10/2004 | Pinnavaia et al. |
| 6,809,061 B2 | 10/2004 | Bogdan et al. |
| 6,811,684 B2 | 11/2004 | Mohr et al. |
| 6,814,943 B2 | 11/2004 | Radcliffe et al. |
| 6,818,589 B1 | 11/2004 | Gillespie |
| 6,833,012 B2 | 12/2004 | Rogers |
| 6,841,143 B2 | 1/2005 | Inagaki et al. |
| 6,843,906 B1 | 1/2005 | Eng |
| 6,843,977 B2 | 1/2005 | Pinnavaia et al. |
| 6,846,546 B2 | 1/2005 | Kuroda et al. |
| 6,866,925 B1 | 3/2005 | Chane-Ching |
| 6,869,906 B2 | 3/2005 | Pinnavaia et al. |
| 6,936,234 B2 | 8/2005 | Bilenko |
| 6,998,104 B2 | 2/2006 | Tao et al. |
| 7,084,087 B2 | 8/2006 | Shan et al. |
| 7,589,041 B2 | 9/2009 | Ying et al. |
| 7,807,132 B2 | 10/2010 | Garcia-Martinez |
| 7,976,696 B2 | 7/2011 | Ying et al. |
| 8,007,663 B2 | 8/2011 | Ying et al. |
| 8,008,223 B2 | 8/2011 | Garcia-Martinez |
| 8,524,624 B2 * | 9/2013 | Garcia-Martinez ...... B01J 20/18 423/700 |
| 8,969,233 B2 * | 3/2015 | Simon ................... B01J 29/084 502/60 |
| 2001/0031241 A1 | 10/2001 | Lacombe et al. |
| 2001/0042440 A1 | 11/2001 | Miyazawa et al. |
| 2003/0054954 A1 | 3/2003 | Chane-Ching et al. |
| 2004/0067842 A1 | 4/2004 | Pinnavaia et al. |
| 2004/0138051 A1 | 7/2004 | Shan et al. |
| 2004/0179996 A1 | 9/2004 | Shan et al. |
| 2005/0074396 A1 | 4/2005 | Takahashi et al. |
| 2005/0130827 A1 | 6/2005 | Schunk |
| 2005/0214539 A1 | 9/2005 | Ying et al. |
| 2006/0078487 A1 | 4/2006 | Endo et al. |
| 2007/0244347 A1 | 10/2007 | Ying et al. |
| 2009/0110631 A1 | 4/2009 | Garcia-Martinez |
| 2010/0190632 A1 | 7/2010 | Dight |
| 2010/0196263 A1 | 8/2010 | Garcia-Martinez |
| 2011/0118107 A1 | 5/2011 | Garcia-Martinez |
| 2011/0171121 A1 | 7/2011 | Senderov |

OTHER PUBLICATIONS

Bagri, R. et al.; Catalytic Pyrolysis of Polyethylene; Anal. Pyrolysis, 63:29-41 (2002).

Conway, B.E., Electrochemical Supercapacitors, Kluwer Academic/Plenum Publishers, New York, 1999, pp. 11-22, 51-63, 125-135, 183-219, 221-224, 255, 335-338, 337-415, 417-440, 598, 602, 615, and 649-666.

Corma, A., From Microporous to Mesoporous Molecular Sieve Materials and Their Use in Catalysis, Chem. Rev., 97:2373-2419, (1997).

(56) References Cited

OTHER PUBLICATIONS

CSIC NM014—Method of Preparation of Mesoporous Alumina with High Thermal Stability, http://www.serina.es/escaparate/verproducto.cgi?idproducto=4980&refcompra=NULO, downloaded May 9, 2007, 2 pages.
Davis, M.E., Ordered Porous Materials for Emerging Applications, Nature, 417:813-821 (2002).
Davis, M.E., Zeolite and Molecular Sieve Synthesis, Chem. Mater., 4:756-768 (1992).
De Moor, P-P.E.A. et al., Imaging the Assembly Process of the Organic-Mediated Synthesis of a Zeolite, Chem. Eur. J., 5(7):2083-2088 (1999).
Degnan, T.F. et al., History of ZSM-5 Fluid Catalytic Cracking Additive Development at Mobile, Microporous Mesoporous Mater, 35-36:245-252 (2000).
De A.A. Soler-Illia, Galo, J. et al., Chemical Strategies to Design Textured Materials from Microporous and mesoporous Oxides to Nanonetworks and Hierarchial Structures, Chem. Rev. 102:4093-4138 (2002).
Galo, J. de A. A. et al., Chemical Strategies to Design Textured Materials: from Microporous and Mesoporous Oxides to Nanonetworks and Hierarchical Structures, Chern. Rev., 2002, 102, 4093-4138.
Geidel, E. et al., Characterization of Mesoporous Materials by Vibrational Spectroscopic Techniques, Microporous and Mesoporous Mater., 65:31-42 (2003).
Gonzalez-Pena, V. et al., Thermally Stable Mesoporous Alumina Synthesized with Non-ionic Surfaces in teh Presence of Amines, Microporous and Mesoporous Materials, 44-45, pp. 203-210 (2001).
Goto, Y., Mesoporous Material from Zeolite, Journal of Porous Materials, 9, 2002, pp. 43-48.
Grieken, Rafael et al., Supercritical Fluid Extraction of a Nonionic Surfactant Template from SBA-15 Materials and Consequences on the Porous Structure, Langmuir 2003, 19, 3966-3973, American Chemical Society, Rey Juan Carlos University, Madrid, Spain, University of California, Santa Barbara, California.
Grudzien, Rafal M. et al., Effective Method for Removal of Polymeric Template from SBA-16 Silica Combining Extraction and Temperaure-controlled Calcination, The Royal Society of Chemistry, 2006, J. Mater. Chem., 2006, 16, 819-823.
Harding, R.H. et al., New Developments in FCC Catalyst Technology, Appl. Catal. A:Gen. 221:389-396 (2001).
Huang, L. et al., Investigation of Synthesizing MCM-41/ZSM Composites, J. Phys. Chem. B. 104:2817-2823 (2000).
Iijima, S., Carbon Nanotubes: Past, Present, and Future, Physica B: Condensed Matter, www.elsevier.com/locate/physb, 2002, 323, pp. 1-5.
International Search Report and Written Opinion dated Nov. 7, 2005 from International Patent Application No. PCT/US2005/05918, filed Feb. 25, 2005.
Joo, S.H., et al., Ordered Nanoporous Arrays of Carbon Supporting High Dispersions of Platinum Nanoparticles, Letters to Nature, www.nature.com, Macmillan Magazines Ltd., Nature, vol. 412, Jul. 12, 2001, pp. 169-172.
Karlsson A. et al., Composites of Micro- and Mesoporous Materials: Simultaneous Syntheses of MFI/MCM-41 Like Phases by a Mixed Template Approach, Microporous and mesoporous Mater, 27: 181-192 (1999).
Kloestra, K.R. et al., Mesoporous Material Containing Framework Tectosilicate by Pore-Wall Recrystallization, Chem. Commun., 23:2281-2282 (1997).
Kyotani, T., Control of Pore Structure in Carbon, Carbon, Institute for Chemical Reaction Science, Tohoku University, 2-1-1, Kaiahira, Sendai 980-8577, Japan, Jun. 1, 1999, ElSevier Science Ltd., pp. 269-286.
Lee, H. et al., Materials Science: On the Synthesis of Zeolites, ScienceWeek, downloaded from http://www.scienceweek.com/2003/sa031031-1.htm on Apr. 23, 2005, 5 pages.
Lin, C. et al., Carbonization and Activation of Sol-gel Derived Carbon Xerogels, Carbon, Department of Chemical Engineering, University of South Carolina, Colombia, SC, Aug. 2, 1999, Elsevier Science Ltd., pp. 849-861.
Linssen, T. et al., Mesoporous Templated Silicates: An Overview of Their Synthesis, Catalytic Activation and Evaluation of the Stability, Advances in Colloid and Interface Science, 103:121-147 (2003).
Liu, Y. et al., Steam-Stable MSU-S Aluminosilicate Mesostructures Assembled from Zeolite ZSM-5 and Zeolite Beta Seeds, Angew. Chem. Int. Ed., 7:1255-1258 (2001).
Liu, Y. et al., Aluminosilicate Mesostructures with Improved Acidity and Hydrothermal Stability, J. Mater. Chem., 12:3179-3190 (2002).
Lyons, D.M. et al., Preparation of Ordered Mesoporous Ceria with Enhanced Thermal Stability, The Journal of Materials Chemistry, vol. 12, pp. 1207-1212 (2002).
Mendes, M.F. et al., Optimization of the Process of Concentration of Vitamin E from DDSO using Supercritical $CO_2$, Brazilian Journal of Chemical Engineering, vol. 22, No. 01, pp. 83-91, Jan.-Mar. 2005.
Moller, K. et al., Synthesis of Ordered Mesoporous Methacrylate Hybrid Systems: Hosts for Molecular Polymer Composites, Department of Chemistry, Purdue University, West Lafayette, IN, American Chemical Society, Dec. 28, 1998, pp. 665-673.
Ogura, M. et al., Formation of Uniform Mesopores in ZSM-5 Zeolite through Treatment in Alkaline Solution, Chemistry Letters 2000, pp. 882-883.
On, D.T. et al., Large-Pore Mesoporous Materials with Semi-Crystalline Zeolitic Frameworks, Angew. Chem. Int. Ed., 17:3248-3251 (2001).
Park, D.W. et al., Catalytic Degration of Polyethylene Over Solid Acid Catalysts, Polym. Degrad. Stabil., 65:193-198 (1999).
Patarin, J. et al., Mild Methods for Removing Organic Templates from Inorganic Host Materials, Highlights, Angew. Chem. Int. Ed. 2004, 43:3878-3880.
Prokesova, P. et al., Preparation of Nanosized Micro/Mesoporous Composites via Simultaneous Synthesis of Beta/MCM-48 Phases, Microporous and Mesoporous Materials 64 (2003) pp. 165-174.
Ryoo, R. et al., Synthesis of Highly Ordered Carbon Molecular Sieves via Template-Mediated Structural Transformation, The Journal of Physical Chemistry B, vol. 103, No. 38, Sep. 16, 1999, pp. 7743-7746.
Scherzer, J. et al., Octane-Enhancing Zeolitic FCC Catalysts—Scientific and Technical Aspects, Marcel Dekker, Inc., 42 pages, (1990).
Storck, S. et al., Characterization of Micro- and Mesoporous Solids by Physisorption Methods and Pore-Size Analysis, Applied Catalysts A: Gen. 17:137-146 (1998).
Tao et al., Mesopore-Modified Zeolites: Preparation, Characterization, and Applications, Chem. Rev., vol. 106, pp. 896-910 (2006).
Triantafyllidis K.S. et al., Gas-oil Cracking Activity of Hydrothermally Stable Aluminosilicate Mesostructures (MSU-S) Assembled from Zeolite Seeds: Effect of the Type of Framework Structure and Porosity, Catalyst Today, vol. 112, pp. 33-36 (2006).
Verhoef, M. J. et al., Partial Transformation of MCM-41 Material into Zeolites: Formation of Nanosized MFI Type Crystallites, Chemical Materials, 2001, vol. 13, pp. 683-687.
Yang, P. et al., Generalized Syntheses of Large-Pore Mesoporous Metal Oxides with Semicrystalline Frameworks, Nature, vol. 396, Nov. 12, 1998, pp. 152-155; www.nature.com.
Ying, J. Y. et al., Synthesis and Applications of Supramolecular-Templated Mesoporous Materials, Angew. Chem. Int. Ed., 38:56-77 (1999).
Zhang, Z. et al, Mesoporous Aluminosilicates with Ordered Hexagonal Structure, Strong Acidity, and Extraordinary Hydrothermal Stability at High Temperatures, J. Of the American Chem. Society, 2001, vol. 123, pp. 5014-5021.
Poladi, Raja H.P.R. et al., Synthesis, Characterization, and Catalytic Properties of a Microporous/Mesoporous Material, MMM-1, Journal of Solid State Chemistry, 2002, vol. 167, pp. 363-369.
Xia, Yongde et al., On the synthesis and characterization of ZSM-5/MCM-48 aluminosilicate composite materials, Journal of the Royal Society of Chemistry, 2004, pp. 863-870.
Guo et al., Characterization of Beta/MCM-41 Composite Molecular Sieve Compared with the Mechanical Mixture Microporous and Mesoporous Materials, vols. 44-45; pp. 427-434.
Tao et al., ZSM-5 Monolith of Uniform Mesoporous Channels, Material Sciences, Chiba University, J. AM. Chem. Soc., Japan 2003, pp. 6044-6045.

* cited by examiner

INTRODUCTION OF MESOPOROSITY INTO ZEOLITE MATERIALS WITH SEQUENTIAL ACID, SURFACTANT, AND BASE TREATMENT

RELATED APPLICATIONS

This application claims priority benefit under 35 U.S.C. Section 119(e) to U.S. Provisional Patent Ser. No. 61/586,457, filed on Jan. 13, 2012, the entire disclosure of which is incorporated herein by reference.

BACKGROUND

1. Field

One or more embodiments of the present invention relate to methods for introducing mesoporosity into zeolitic materials.

2. Description of Related Art

U.S. Patent Application Publication No. 2007/0244347 describes a method for introducing mesoporosity into zeolites. Prior to treatment, these zeolites, such as ultrastable zeolite Y ("USY") provided by Zeolyst International, have a high silicon-to-aluminum ratio ("Si/Al") and low extra-framework content. As previously described, these zeolites can be treated in the presence of a pore forming agent (e.g., a surfactant) at a controlled pH under certain time and temperature conditions to introduce mesoporosity into the zeolites. This method of introducing mesoporosity into a zeolite has been referred to as a "riving" process. Thereafter, the mesostructured material can be treated to remove the pore forming agent. Although advances have been made in the art of introducing mesoporosity into zeolites, improvements are still needed.

SUMMARY

One embodiment of the present invention concerns a method of forming a material comprising a mesoporous zeolitic material having long-range crystallinity. The method of this embodiment comprises: (a) contacting an initial zeolitic material having long-range crystallinity with an acid to thereby form an acid-treated zeolitic material having long-range crystallinity; (b) contacting said acid-treated zeolitic material having long-range crystallinity with a surfactant to thereby form a first treatment mixture comprising the surfactant and an intermediate surfactant-treated material; (c) recovering at least a portion of the intermediate surfactant-treated material from the first treatment mixture to thereby form an at least partially isolated intermediate surfactant-treated material; and (d) contacting the at least partially isolated intermediate surfactant-treated material with a base to thereby form the mesoporous zeolitic material having long-range crystallinity.

Another embodiment of the present invention concerns a method of forming a material comprising a mesoporous zeolite. The method of this embodiment comprises: (a) combining an initial zeolite with an acid and a surfactant to thereby form a treated zeolite; (b) recovering at least a portion of the treated zeolite to thereby form an at least partially isolated intermediate treated zeolite; and (c) contacting the at least partially isolated intermediate treated zeolite with a base to thereby form the mesoporous zeolite.

Yet another embodiment of the present invention concerns a composition comprising a mesoporous zeolite. The mesoporous zeolite of this embodiment has a total 20 to 135 Å diameter mesopore volume of at least 0.2 cc/g and a total 0 to 20 Å micropore volume of at least 0.1 cc/g. The mesoporous zeolite of this embodiment exhibits these mesopore and micropore volumes after steaming at 1,450° F. (788° C.) for 8 hours with 100% steam.

BRIEF DESCRIPTION OF THE DRAWING FIGURES

Embodiments of the present invention are described herein with reference to the following drawing figures, wherein.

DETAILED DESCRIPTION

Figure 1:
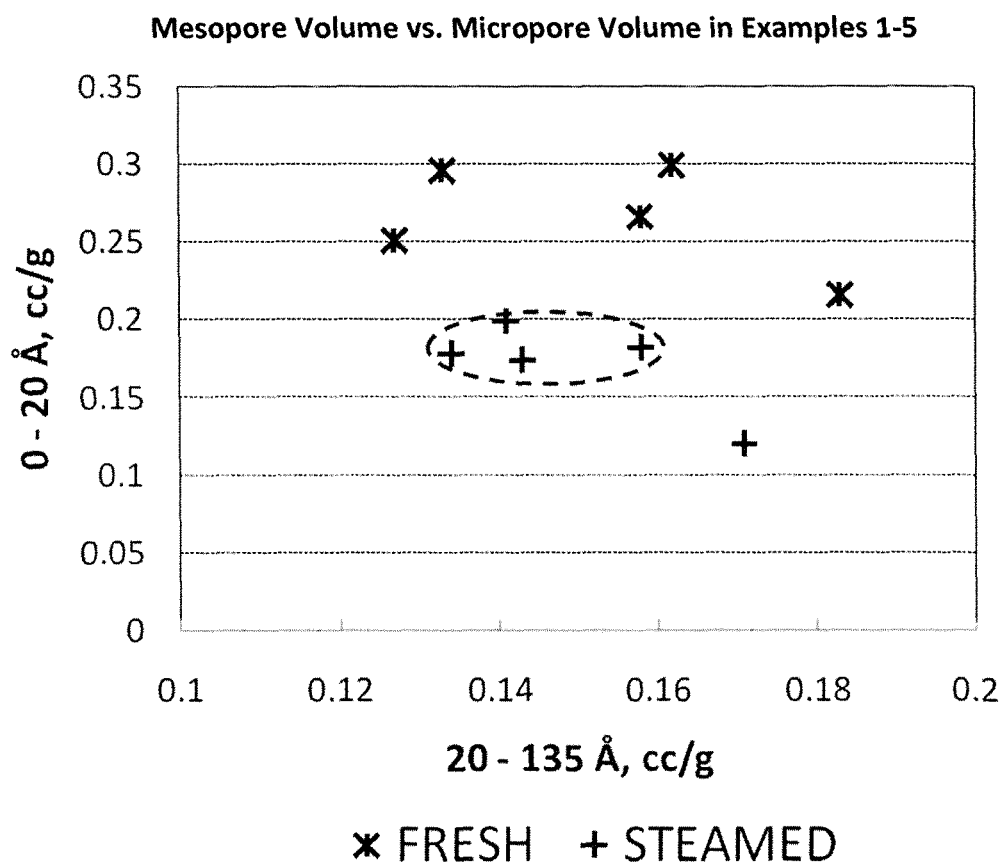
FIG. 1 is a graph of mesopore volume versus micropore volume for the samples prepared in Examples 1-5, particularly illustrating the balance between micropore volume decrease and mesopore volume increase in the samples of Examples 1-5, where the area of optimal micro- and meso-pore volume combinations is circled.

Various embodiments of the present invention concern methods for preparing a material containing a mesoporous zeolitic material having long-range crystallinity. In one or more embodiments, the mesoporous zeolitic material can be prepared by contacting an initial zeolitic material with a surfactant, at least partially separating the zeolitic material from the surfactant, and thereafter contacting the zeolitic material with a base. The resulting mesoporous zeolitic material can then be subject to various post-treatment procedures and/or be employed in a variety of applications.

As noted above, an initial zeolitic material can be employed in forming the mesoporous zeolitic materials. In one or more embodiments, the initial zeolitic material can be a non-mesostructured zeolitic material. In other various embodiments, the initial zeolitic material can be a non-mesoporous zeolitic material. As used herein, the term "non-mesoporous" shall denote a composition having a total volume of less than 0.05 cc/g of 20 to 80 Å diameter mesopores. In various embodiments, initial inorganic starting materials can have a total 20 to 80 Å diameter mesopore volume of less than 0.01 cc/g. Additionally, suitable initial zeolitic materials can have a total 0 to 20 Å micropore volume of at least 0.3 cc/g.

In various embodiments, the initial zeolitic material can have a 1-dimensional, 2-dimensional, or 3-dimensional pore structure. Additionally, the initial zeolitic material can itself exhibit long-range crystallinity. Materials with long-range crystallinity include all solids with one or more phases having repeating structures, referred to as unit cells, that repeat in a space for at least 10 nm.

Examples of zeolitic materials suitable for use as the initial zeolitic material include, but are not limited to, aluminosilicates, zeolites, zeotypes, aluminophosphates, silico-aluminophosphates, gallophosphates, zincophosphates, and titanophosphates. Combinations of two or more types of these zeolitic materials can also be employed as the initial zeolitic material. In addition, the zeolitic material can be a zeolite-like material, which represents a growing family of inorganic and organic/inorganic molecular sieves.

In one or more embodiments, the initial zeolitic material comprises a zeolite. Examples of zeolites suitable for use as the initial zeolitic material include, but are not limited to, zeolite A, faujasites (e.g., zeolites X and Y; "FAU"), mordenite ("MOR"), CHA, ZSM-5 ("MFI"), ZSM-12, ZSM-22, beta zeolite, synthetic ferrierite (i.e., ZSM-35), synthetic mordenite, and mixtures of two or more thereof. Additionally, ultrastable (e.g., zeolite USY) and/or acid forms of zeolites can also be employed. In various embodiments, the initial zeolitic material can comprise faujasite, mordenite, ZSM-5, or mixtures of two or more thereof. In another embodiment, the initial zeolitic material comprises faujasite. In yet another embodiment, the zeolite can be a zeolite Y selected from the group consisting of USY, $NH_4Y$, NaY, a rare earth ion zeolite Y, or mixtures thereof.

In various embodiments, the initial zeolitic material can have a low framework silicon-to-aluminum ratio ("Si/Al"). For example, the initial zeolitic material can have a framework Si/Al ratio of less than 30, less than 25, less than 20, less than 15, or less than 10. Additionally, the initial zeolitic material can have a framework Si/Al ratio in the range of from about 1 to about 30, in the range of from about 2 to about 25, or in the range of from 5 to 20. Note that, as used herein, the silicon-to-aluminum ratio refers to the elemental ratio (i.e., silicon atoms to aluminum atoms) of the zeolitic material; this is in contrast to another commonly used parameter, the silica-to-alumina ratio (i.e., $SiO_2/Al_2O_3$) of the zeolitic material. Generally, the Si/Al of a zeolitic material can be determined via bulk chemical analysis. This method, however, does not distinguish between framework aluminum atoms and extra-framework aluminum ("EFAL") atoms in the zeolitic material. As will be understood to those of ordinary skill in the art, the framework Si/Al can be determined by a combination of methods, such as using both bulk chemical analysis and aluminum-27 nuclear magnetic resonance ("$^{27}$Al NMR") and/or silicon-29 nuclear magnetic resonance ("$^{29}$Si NMR"). In various embodiments described herein, the framework Si/Al can be determined by known methods in the art. For example, a combination of bulk chemical analysis and $^{27}$Al NMR can be employed for determining the framework Si/Al of the zeolitic material.

In various embodiments, the initial zeolitic material can be present as a part of a composite shaped article comprising at least one zeolitic material (e.g., a zeolite) and at least one non-zeolitic material. In one or more embodiments, the zeolitic material in the composite shaped article can be a zeolite. Furthermore, the zeolitic material can comprise a zeolite selected from the group consisting of faujasite, mordenite, ZSM-5, CHA, or mixtures of two or more thereof. In certain embodiments, the zeolite comprises faujasite. The composite shaped article can comprise the zeolitic material (e.g., a zeolite) in an amount of at least 0.1 weight percent, at least 15 weight percent, or at least 30 weight percent based on the total weight of the composite shaped article. Furthermore, the composite shaped article can comprise the zeolitic material (e.g., a zeolite) in an amount in the range of from about 0.1 to about 99 weight percent, in the range of from about 5 to about 95 weight percent, in the range of from about 15 to about 70 weight percent, or in the range of from 30 to 65 weight percent based on the total weight of the composite shaped article. The non-zeolitic material of the composites shaped article can include, for example, one or more binder material components.

In preparing the above-mentioned mesoporous materials, the initial zeolitic material can first optionally be combined with water to form an initial slurry. The water useful in forming the initial slurry can be any type of water. In various embodiments, the water employed in forming the optional initial slurry can be deionized water. In one or more embodiments, the initial zeolitic material can be present in the optional initial slurry in an amount in the range of from about 1 to about 50 weight percent, in the range of from about 5 to about 40 weight percent, in the range of from about 10 to about 30 weight percent, or in the range of from about 15 to about 25 weight percent. In certain embodiments, the optional initial slurry can comprise the initial zeolitic material in an amount of about 20 weight percent.

In forming the mesoporous zeolitic material, the initial zeolitic material (optionally as part of an initial slurry) can be contacted with a surfactant, which thereby forms an initial treatment mixture comprising the initial zeolitic material and a surfactant. Any now known or hereafter discovered surfactants may be employed in the various embodiments described herein. In certain embodiments, a cationic surfactant can be employed. In one or more embodiments, the surfactant employed can comprise one or more alkyltrimethyl ammonium salts and/or one or more dialkyldimethyl ammonium salts. In various embodiments, the surfactant can be selected from the group consisting of cetyltrimethyl ammonium bromide ("CTAB"), cetyltrimethyl ammonium chloride ("CTAC"), and mixtures thereof. In other embodiments, the surfactant comprises a non-ionic surfactant. Examples of suitable commercially available non-ionic surfactants include, but are not limited to, Pluronic™ surfactants (e.g., Pluronic P123™), available from BASF.

In various embodiments, the pH of the resulting initial treatment mixture can optionally be adjusted. For example, the pH of the resulting initial treatment mixture can be adjusted to fall within the range of from about 4 to about 8, or in the range of from about 5 to about 7. Various pH adjusting agents (e.g., acids or bases) may be employed during this optional pH adjustment step. In certain embodiments, the pH of the initial treatment mixture can optionally be adjusted with an acid. Any known organic or inorganic acid can be employed for optionally adjusting the pH of the initial treatment mixture. Examples of acids suitable for use in adjusting the pH of the initial treatment mixture can include, but are not limited to, hydrochloric acid, nitric acid, sulfuric acid, formic acid, acetic acid, sulfonic acid, and oxalic acid.

Following formation of the initial treatment mixture, whose pH has optionally been adjusted, an acid can be introduced into the initial treatment mixture thereby forming a second treatment mixture comprising the acid, the surfactant, and the zeolitic material. Acids suitable for use can be any organic or inorganic (mineral) acids. In various embodiments, the acid employed in this step of the formation process can be a dealuminating acid. In further embodiments, the acid can also be a chelating agent. Specific examples of acids suitable for use include, but are not limited to, hydrochloric acid, sulfuric acid, nitric acid, acetic acid, sulfonic acid, oxalic acid, citric acid, ethylenediaminetetraacetic acid, tartaric acid, malic acid, glutaric acid, succinic acid, and mixtures of two or more thereof. In certain embodiments, the initial treatment mixture can be prepared and/or subsequent mesopore formation steps can be performed in the absence or substantial absence of hydrofluoric acid. As used herein, the term "substantial absence" means a concentration of less than 10 parts per million by weight ("ppmw").

In various embodiments, the amount of acid employed in the initial treatment mixture can be in the range of from about 1 to about 10 milliequivalents per gram of the above-described initial zeolitic material, in the range of from about 2 to about 8 milliequivalents, or in the range of from 3 to 6 milliequivalents. Additionally, the acid can be added to the initial treatment mixture by any methods known or hereafter discovered in the art. In certain embodiments, the acid can be added to the initial treatment mixture over a period of time. For example, the acid can be added to the initial treatment mixture over a period of time in the range of from about 5 minutes to about 10 hours, in the range of from about 10 minutes to about 5 hours, or in the range of from about 30 minutes to about 2 hours. Furthermore, in various embodiments, the acid can be added drop-wise to the initial treatment mixture. In one or more embodiments, the resulting second treatment mixture can have a pH in the range of from about 2 to about 6, or in the range of from 3 to 4.

It should be noted that, in various embodiments, the order of addition of the acid and the surfactant can be reversed. In other words, in certain embodiments, the initial zeolitic material can first be contacted with an acid followed by being contacted with a surfactant. In still other embodiments, the acid and surfactant can be combined prior to contact with the initial zeolitic material, thereby providing simultaneous or substantially simultaneous contact with the initial zeolitic material. In yet other embodiments, the acid treatment and the surfactant treatment may be performed at least partially separately. In one such embodiment, the initial zeolitic material can be dispersed in water, as described above. The pH of the dispersion can then optionally be adjusted as described above. Thereafter, the acid may be added to the dispersion. Following the acid treatment, the mixture can be filtered, optionally washed with water, and vacuum dried. The vacuum-dried wet cake can then be dispersed in a surfactant, such as described above, thereby forming a second treatment mixture. In further embodiments, the initial zeolitic material can first be contacted with an acid, followed by dispersion in deionized water; thereafter, the surfactant can be added to the mixture. Regardless of the order of addition, the above-described reagents, concentration ratios, conditions, and procedures may still be employed. Additionally, in various embodiments, the above-described processes can be performed in the absence or substantial absence of a base.

Irrespective of the formation procedure, the resulting second treatment mixture can be agitated for a period of time. Any methods of agitation known or hereafter discovered in the art can be employed. For example, stirring, shaking, rolling, and the like may be employed to agitate the resulting second treatment mixture. In one or more embodiments, the second treatment mixture can be agitated for a period of time ranging from about 1 minute to about 24 hours, from about 5 minutes to about 12 hours, from about 10 minutes to about 6 hours, or from about 30 minutes to about 2 hours. Furthermore, the second treatment mixture can be heated (in the presence or absence of agitation) for a period of time. For instance, the second treatment mixture can be heated at a temperature in the range of from about 30 to about 100° C., or in the range of from about 40 to about 80° C. for a period of time ranging from about 30 minutes to about one week, or in the range of from about an hour to about 2 days. Furthermore, any combination of room-temperature agitation and heated agitation can be employed.

Following treatment with the above-described acid and surfactant, at least a portion of the resulting surfactant-treated zeolitic material can be recovered from the second treatment mixture. Recovery of the surfactant-treated zeolitic material can be performed by any solid/liquid separation techniques known or hereafter discovered in the art. For instance, the second treatment mixture can be subjected to filtration. In various embodiments, the recovered surfactant-treated zeolitic material can be washed (e.g., with deionized water) one or more times. Optionally, the surfactant-treated zeolitic material can be filtered again after washing. In other embodiments, the filtered surfactant-treated zeolitic material is not washed following filtration. Accordingly, in various embodiments, the separated surfactant-treated zeolitic material can retain at least a portion of the surfactant employed as described above. In certain embodiments, the separated surfactant-treated zeolitic material can comprise a cation of the surfactant in an amount in the range of from about 1 to about 30 weight percent, in the range of from about 5 to about 20 weight percent, or in the range of from 7 to 16 weight percent. By way of example, if the surfactant employed is a cetyltrimethyl ammonium halide (e.g., CTAC or CTAB), the separated surfactant-treated zeolitic material can comprise a cetyltrimethyl ammonium cation (i.e., $CTA^+$) in an amount in the range of from about 1 to about 30 weight percent, in the range of from about 5 to about 20 weight percent, or in the range of from 7 to 16 weight percent.

Once the surfactant-treated zeolitic material has been recovered, or at least partially recovered, from the second treatment mixture, it can be contacted with a base. Any base known or hereafter discovered can be employed in the various embodiments described herein for treating the recovered surfactant-treated zeolitic material. In various embodiments, the base can be selected from the group consisting of NaOH, quaternary ammonium hydroxides (e.g., $NH_4OH$), KOH, $Na_2CO_3$, TMAOH, and mixtures thereof. In certain embodiments, the recovered surfactant-treated zeolitic material can be contacted with NaOH. Additionally, the base employed can be in the form of a solution having a concentration in the range of from 0.2 to 15 percent.

In one or more embodiments, treatment of the surfactant-treated zeolitic material with a base can be performed under elevated temperature conditions. As used herein, the term "elevated temperature" shall denote any temperature greater than room temperature. In various embodiments, contacting the surfactant-treated zeolitic material with a base can be performed at a temperature in the range of from about 30 to about 200° C., in the range of from about 50 to about 150° C., or at about 80° C. Additionally, the amount of base employed can be such that the base is present at a ratio with the initial quantity of the initial zeolitic material (described above) in the range of from about 0.1 to about 20 mmol per gram of initial zeolitic material, in the range of from about 0.1 to about 5 mmol per gram of initial zeolitic material, or in the range of from about 0.9 to about 4 mmol per gram of initial zeolitic material. In other various embodiments, the amount of base employed can be such that the base is present at a ratio with the initial quantity of the initial zeolitic material (described above) of at least 2 mmol per gram of initial zeolitic material. Furthermore, treatment with the base can be performed over a period of time. For example, treatment of the surfactant-treated zeolitic material with a base can be performed over a period of time in the range of from about 1 minute to about 2 days, in the range of from about 30 minutes to about 1 day, in the range of from about 2 hours to about 20 hours, or in the range of from 16 to 18 hours.

Following treatment with a base, at least a portion of the resulting mesoporous zeolitic material can be separated from the basic treatment mixture. For example, the mesoporous zeolitic material can be filtered, washed, and/or dried. In one or more embodiments, the mesoporous zeolitic material can be filtered via vacuum filtration and washed with water. Thereafter, the recovered mesoporous zeolitic material can optionally be filtered again and optionally dried.

In various embodiments, the resulting mesoporous zeolitic material can be subjected to one or more post-formation treatments. Suitable post-formation treatments are described, for example, in U.S. Patent Application Publication No. 2007/0244347, which is incorporated herein by reference in its entirety. In various embodiments, the mesoporous zeolitic material can be subjected to one or more post-formation treatments selected from the group consisting of calcination, ion exchange, steaming, incorporation into an adsorbent, incorporation into a catalyst, re-alumination, silicon incorporation, incorporation into a membrane, and combinations of two or more thereof. Suitable ion exchange procedures for the resulting mesoporous zeolitic materials include, but are not limited to, ammonium ion exchange, rare earth ion exchange, lithium ion exchange, potassium ion exchange, calcium ion exchange, and combinations of two or more thereof.

In various embodiments, following separation from the basic treatment mixture the mesoporous zeolitic material can be subjected to a first ion exchange. For example, the mesoporous zeolitic material can be ion exchanged with a solution of $NH_4NO_3$. Thereafter, in various embodiments, the mesoporous zeolitic material can be subjected to calcination. In one or more embodiments, the mesoporous zeolitic material can be subjected to one or more calcinations at a temperature in the range of from about 500 to about 700° C. In certain embodiments, an initial calcination can be performed under 100% water vapor, or a mixture of water vapor and $NH_3$ (e.g., up to 50% $NH_3$, with the remainder water vapor) at a temperature of about 650° C. for a period of time (e.g., half an hour). Thereafter, the mesoporous zeolitic material can be cooled to a temperature of about 550° C. and calcined under a nitrogen environment for a period of time (e.g., 1 hour) followed by calcination under an air environment for a period of time (e.g., 1 hour). The total time period employed for heat treatment of the mesoporous zeolitic material can be in the range of from about 30 minutes to about 24 hours, or in the range of from 1 to 12 hours. Following calcination, the mesoporous zeolitic material can undergo a second ion exchange (e.g., with a solution of $NH_4NO_3$). Following ion exchange, the zeolitic material can have a residual soda ($Na_2O$) content in the range of from about 0.1 to about 0.3 weight percent.

In various embodiments, at least a portion of the surfactant removed during the above-described calcination procedures can be recovered for reuse. Thus, in one or more embodiments, at least a portion of the recovered surfactant can be employed for contacting a second initial zeolitic material having long-range crystallinity thereby forming additional mesoporous zeolitic material having long-range crystallinity. The procedures outline above may be employed in forming this second mesoporous zeolitic material.

Following the above-described post-formation treatments, the mesoporous zeolitic material can be subjected to steam stabilization. Thus, in various embodiments, the mesoporous zeolitic material can be contacted with steam under elevated temperatures for a period of time. The steam employed can be 100% water vapor. Additionally, steaming of the mesoporous zeolitic material can be performed at a temperature in the range of from about 1,200 to about 1,600° F., in the range of from about 1,300 to 1,600° F., in the range of from about 1,400 to about 1,500° F., or at about 1,450° F. Additionally, steaming of the mesoporous zeolitic material can be conducted for a period of time in the range of from about 10 minutes to about 24 hours, in the range of from about 1 hour to about 12 hours, or about 8 hours.

The resulting mesoporous zeolitic material can be a one-phase hybrid single crystal having long-range crystallinity, or be fully crystalline, and can include mesopore surfaces defining a plurality of mesopores. As used herein, the terms "long-range crystallinity" and "fully crystalline" are substantially synonymous, and are intended to denote solids with one or more phases having repeating structures, referred to as unit cells, that repeat in a space for at least 10 nm. Furthermore, a cross-sectional area of each of the plurality of mesopores can be substantially the same. Additionally, in one or more embodiments the mesoporous zeolitic material can be a mesostructured zeolitic material.

In various embodiments, the mesoporous zeolitic material can have a total 20 to 135 Å diameter mesopore volume of at least 0.05, 0.06, 0.07, 0.08, 0.09, 0.10, 0.11, 0.12, 0.13, 0.14, 0.15, 0.20, 0.21, 0.22, 0.23, 0.24, 0.25, 0.26, 0.27, 0.28, 0.29, or 0.30 cc/g. Furthermore, the mesoporous zeolitic material can have a total 20 to 135 Å diameter mesopore volume in the range of from about 0.05 to about 0.70 cc/g, in the range of from about 0.05 to about 0.35 cc/g, in the range of from about 0.10 to about 0.60 cc/g, in the range of from about 0.15 to about 0.50 cc/g, in the range of from about 0.20 to about 0.40 cc/g, in the range of from about 0.20 to about 0.35 cc/g, or in the range of from about 0.20 to about 0.30 cc/g.

In various embodiments, the resulting mesoporous zeolitic material can have a total 20 to 135 Å diameter mesopore volume that is at least 5, at least 10, at least 20, at least 30, at least 40, at least 50, at least 60, at least 70, at least 80, at least 90, at least 100, at least 200, at least 300, at least 400, or at least 500 percent greater than the 20 to 135 Å diameter mesopore volume of the above-described initial zeolitic material. Furthermore, the mesoporous zeolitic material can have a total 20 to 135 Å diameter mesopore volume that is at least 0.02, at least 0.04, at least 0.05, at least 0.06, at least 0.07, at least 0.08, at least 0.09, at least 0.1, at least 0.2, or at least 0.35 cc/g greater than the total 20 to 135 Å diameter mesopore volume of the initial zeolitic material.

In various embodiments, the mesoporous zeolitic material can have a total 20 to 300 Å diameter mesopore volume of at least 0.10, 0.15, 0.20, 0.25, 0.20, or 0.3 cc/g. Furthermore, the mesoporous zeolitic material can have a total 20 to 300 Å diameter mesopore volume in the range of from about 0.1 to about 0.50 cc/g, in the range of from about 0.15 to about 0.4 cc/g, or in the range of from about 0.20 to about 0.35 cc/g.

In various embodiments, the resulting mesoporous zeolitic material can have a total 20 to 300 Å diameter mesopore volume that is at least 5, at least 10, at least 20, at least 30, at least 40, at least 50, at least 60, at least 70, at least 80, at least 90, at least 100, at least 200, at least 300, at least 400, or at least 500 percent greater than the 20 to 300 Å diameter mesopore volume of the above-described initial zeolitic material. Furthermore, the mesoporous zeolitic material can have a total 20 to 300 Å diameter mesopore volume that is at least 0.02, at least 0.04, at least 0.05, at least 0.06, at least 0.07, at least 0.08, at least 0.09, at least 0.1, at least 0.2, at least 0.3, or at least 0.35 cc/g greater than the total 20 to 300 Å diameter mesopore volume of the initial zeolitic material.

In various embodiments, the mesoporous zeolitic material can have a 0 to 20 Å micropore volume of at least 0.10, at least 0.11, at least 0.12, at least 0.13, at least 0.14, or at least 0.15 cc/g. Additionally, the mesoporous zeolitic material can have a total 0 to 20 Å diameter micropore volume in the range of from about 0 to about 0.40 cc/g, in the range of from about 0.01 to about 0.35 cc/g, in the range of from about 0.02 to about 0.30 cc/g, in the range of from about 0.03 to about 0.25 cc/g, or in the range of from about 0.12 to about 0.25 cc/g.

In one or more embodiments, the mesoporous zeolitic material can exhibit the above-described mesopore and micropore volumes after being subjected to the above-described steam treatment. For example, in various embodiments, the mesoporous zeolitic material can exhibit the above-described mesopore and micropore volumes after steaming at 1,450° F. for 8 hours with 100% steam.

In various embodiments, when the initial zeolitic material is a zeolite, the mesoporous zeolite can have a framework Si/Al of less than less than 30, less than 25, less than 20, less than 15, or less than 10. Additionally, the mesoporous zeolite can have a framework Si/Al ratio in the range of from about 1 to about 30, in the range of from about 2 to about 25, or in the range of from 5 to 20.

In one or more embodiments, the mesoporous zeolitic material can have a crystalline content of at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent, as measured by X-ray diffraction ("XRD").

Applications

The unique structure of mesoporous zeolitic materials can be useful to a variety of fields, and should address certain limitations associated with conventional zeolites. As catalysis is an important field of application for zeolites, special emphasis is placed on the catalytic applications of mesoporous zeolitic materials.

The combination of a mesostructure, high surface-area, and controlled pore or interior thickness as measured between adjacent mesopores should provide for access to bulky molecules and reduce the intracrystalline diffusion barriers. Thus, enhanced catalytic activity for bulky molecules should be observed using mesoporous zeolitic materials having long-range crystallinity, as compared to conventional zeolites. Catalytic cracking is selectivity and/or efficiency limited because diffusion is limited by the small pore size of the zeolite H—Y. Because the conventional unconverted zeolite crystal has limited diffusion, it is difficult for an initial reaction product (e.g., 1,3-diisopropyl benzene) to exit the zeolite. As a result, over cracking occurs and light compounds are formed resulting in excess formation of undesirable products, such as cumene, benzene, and coke. In contrast to catalytic cracking with the unmodified conventional zeolite H—Y, the larger pore size, the controlled mesopore volume, and the controlled interior or pore wall thickness present in the mesoporous zeolitic material facilitates the exit of desired products (i.e., 1,3-diisopropyl benzene) from the mesostructure, and over cracking that produces cumene, benzene, and coke is avoided. As a result, there is a higher conversion of the desired product, 1,3-diisopropyl benzene.

Acid catalysts with well-defined ultra-large pores are highly desirable for many applications, especially for catalytic cracking of the gas oil fraction of petroleum, whereby slight improvements in catalytic activity or selectivity would translate to significant economic benefits. More than 135 different zeolitic structures have been reported to date, but only about a dozen of them have commercial applications, mostly zeolites with 3-D (3-dimensional) pore structures. The incorporation of 3-D mesopores may be beneficial for zeolites with 1-D and 2-D pore structures as it would greatly facilitate intracrystalline diffusion. Zeolites with 1-D and 2-D pore structures are not widely used, because the pore structure is less then optimal.

Pyrolysis of plastics has gained renewed attention due to the possibility of converting these abundant waste products into valuable chemicals while also producing energy. Acidic catalysts, such as zeolites, have been shown to be able to reduce significantly the decomposition temperature of plastics and to control the range of products generated. However, the accessibility of the bulky molecules produced during plastic degradation has been severely limited by the micropores of zeolites. The use of mesoporous zeolitic materials can allow for reduced decomposition temperatures compared to unmodified commercial zeolites.

With their improved accessibility and diffusivity compared to conventional zeolites, mesoporous zeolitic materials may also be employed in place of unmodified conventional zeolites in other applications, such as, for example, gas and liquid-phase adsorption, separation, catalysis, catalytic cracking, catalytic hydrocracking, catalytic isomerization, catalytic hydrogenation, catalytic hydroformilation, catalytic alkylation, catalytic acylation, ion-exchange, water treatment, and pollution remediation. Many of these applications suffer currently from limitations associated with the small pores of zeolites, especially when bulky molecules are involved. Mesoporous zeolitic materials present attractive benefits over zeolites in such applications.

Organic dye and pollutant removal from water is of major environmental importance, and represents the third major use of zeolites (accounting for 80 tons of zeolites per year). However, most of the organic dyes are bulky, which make their removal slow or incomplete, requiring a huge excess of zeolites in the process. Mesoporous zeolitic materials offer significant advantage over unmodified conventional zeolites in organic dye and pollutant removal with their larger surface area and pore size.

Application in Petrochemical Processing

The mesoporous zeolitic materials can have one or more of controlled pore volume, controlled pore size (e.g., cross sectional area and/or diameter), and controlled pore shape. Hydrocarbon reactions, including petrochemical processing, are mass-transfer limited. Accordingly, a mesoporous catalyst with controlled pore volume, pore size, and/or pore shape can facilitate transport of the reactants to and within active catalyst sites within the mesoporous catalyst and transport the products of the reaction out of the catalyst. Mesoporous zeolitic materials enable processing of very large or bulky molecules with dimensions of, for example, from about 2 to about 60 nm, from about 5 to about 50 nm, and from about 30 to about 60 nm.

Hydrocarbon and/or petrochemical feed materials that can be processed with the mesoporous zeolitic materials include, for example, a gas oil (e.g., light, medium, or heavy gas oil) with or without the addition of resids. The feed material can include thermal oils, residual oils, (e.g., atmospheric tower bottoms ("ATB"), heavy gas oil ("HGO"), vacuum gas oil ("VGO"), and vacuum tower bottoms ("VTB"), cycle stocks, whole top crudes, tar sand oils, shale oils, synthetic fuels (e.g., products of Fischer-Tropsch synthesis), heavy hydrocarbon fractions derived from the destructive hydrogenation of coal, tar, pitches, asphalts, heavy crude oils, sour crude oils, metal-laden crude oils, and waxy materials, including, but not limited to, waxes produced by Fischer-Tropsch synthesis of hydrocarbons from synthesis gas. Hydrotreated feedstocks derived from any of the above described feed materials may also be processed by using the mesoporous zeolitic materials.

Heavy hydrocarbon fractions from crude oil contain most of the sulfur in crude oils, mainly in the form of mercaptans, sulfides, disulfides, thiophenes, benzothiophenes, dibenzothiophenes, and benzonaphthothiophenes, many of which are large, bulky molecules. Similarly, heavy hydrocarbon fractions contain most of the nitrogen in crude oils, principally in the form of neutral N-compounds (e.g., indole and carbazole), basic N-compounds (e.g., pyridine, quinoline, acridine, and phenenthridine), and weakly basic N-compounds (e.g., hydroxipyridine and hydroxiquinoline) and their substituted H-, alkyl-, phenyl- and naphthyl-substituted derivatives, many of which are large, bulky materials. Sulfur and nitrogen species can be removed for production of clean fuels and resids or deeper cut gas oils with high metals content can also be processed using the mesoporous zeolitic materials described herein.

In various embodiments, the mesoporous zeolitic materials can be employed in chemical processing operations including, for example, catalytic cracking, fluidized catalytic cracking, hydrogenation, hydrosulfurization, hydrocracking, hydroisomerization, oligomerization, alkylation, or any of these in combination. Any of these chemical processing operations may be employed to produce, for example, a petrochemical product by reacting a petrochemical feed material with the mesoporous zeolitic materials described herein.

In various embodiments, the mesoporous zeolitic material can be used as an additive to other catalysts and/or other separation materials including, for example, a membrane, an adsorbent, a filter, an ion exchange column, an ion exchange membrane, or an ion exchange filter.

In various embodiments, the mesoporous zeolitic material can be used alone or in combination as an additive to a catalyst. The mesoporous zeolitic material can be added at from about 0.05 to about 100 weight percent to the catalyst. The additive may be employed in chemical processing operations including, for example, catalytic cracking, fluidized catalytic cracking, hydrogenation, hydrosulfurization, hydrocracking, hydroisomerization, oligomerization, alkylation, or any of these in combination. For example, the addition of small amounts of mesoporous zeolitic materials and/or crystalline nanostructured zeolites to conventional commercially available FCC catalysts allows for improvement in the catalytic performance.

Generally, FCC uses an FCC catalyst, which is typically a fine powder with a particle size of about 10 to 200 microns. The FCC catalyst can be suspended in the feed and propelled upward into a reaction zone. A relatively heavy hydrocarbon or petrochemical feedstock (e.g., a gas oil) can be mixed with the FCC catalyst to provide a fluidized suspension. The feedstock can be cracked in an elongated reactor, or riser, at elevated temperatures to provide a mixture of petrochemical products that are lighter hydrocarbon products than were provided in the feedstock. Gaseous reaction products and spent catalyst are discharged from the riser into a separator where they can be regenerated. Typical FCC conversion conditions employing FCC catalysts include a riser top temperature of about 500 to about 595° C., a catalyst/oil weight ratio of about 3 to about 12, and a catalyst residence time of about 0.5 to about 15 seconds. The higher activity of the mesoporous zeolitic materials can enable less severe processing conditions, such as, for example, lower temperature, lower catalyst to oil ratios, and/or lower contact time.

In various embodiments, a small amount of mesoporous zeolitic material blended with conventional FCC catalysts can enable pre-cracking of the bulkier molecules. Conventional FCC catalysts have pore sizes too small to accommodate bulkier molecules. After the bulkier molecules have been pre-cracked they are processed in the small pores of the conventional FCC catalyst.

In various embodiments, mesoporous zeolitic materials can be blended with conventional catalysts. The additive mesoporous zeolitic materials having long-range crystallinity can be incorporated into the conventional catalyst pellet. Shaped (e.g., pelletized) mesoporous materials can be mixed with the catalyst pellet. Alternatively, a conventional catalyst and the mesoporous zeolitic materials having long-range crystallinity can be layered together. Any such mixture can be used in a refining application, for example, in fluidized catalytic cracking directly as is done with other additives. The amount of mesoporous zeolitic material added and the manner by which it is blended can be used to tune the yield and/or the structure of the products.

In one or more embodiments, the addition of or incorporation of mesoporous zeolitic materials to conventional commercially available Thermofor Catalytic Cracking ("TCC") catalysts can provide an improvement in the catalytic performance. The TCC process is a moving bed process that uses pellet or bead shaped conventional catalysts having an average particle size of about one-sixty-fourth to one-fourth inch. Hot catalyst beads progress with a hydrocarbon or petrochemical feedstock downwardly through a cracking reaction zone. The hydrocarbon products are separated from the spent catalyst and recovered. The catalyst is recovered at the lower end of the zone and recycled (e.g., regenerated). Typically, TCC conversion conditions include an average reactor temperature from about 450 to about 510° C., a catalyst/oil volume ratio of from about 2 to about 7, and a reactor space velocity of from about 1 to about 2.5 vol/hr/vol. Mesoporous zeolitic materials can be substituted for TCC catalysts to improve the catalytic cracking of petrochemical or hydrocarbon feedstocks to petroleum product. Alternatively, the mesoporous zeolitic materials having long-range crystallinity can be blended with the TCC catalyst.

In various embodiments, mesoporous zeolitic materials can be used as catalyst additives in any other catalytic application. For example, they may be used as additives in processes where bulky molecules must be processed.

In other various embodiments, mesoporous zeolitic materials can be used in hydrogenation. Conventional zeolites are good hydrogenation supports because they possess a level of acidity needed both for the hydrogenation of the aromatic compounds and for tolerance to poisons such as, for example, sulfur. However, the small pore size of conventional zeolites limit the size of the molecules that can be hydrogenated. Various metals, such as Pt, Pd, Ni, Co, Mo, or mixtures of such metals, can be supported on mesoporous zeolitic materials using surface modification methods, for example, ion exchange, described herein. The hydrogenation catalytic activity of mesoporous zeolitic materials modified to support various metals (e.g., doped with metals) shows a higher hydrogenation activity for bulky aromatic compounds as compared to other conventional materials, for example, metal supported on alumina, silica, metal oxides, MCM-41, and conventional zeolites. The mesoporous zeolitic materials modified to support various metals also show, compared to conventional materials, a higher tolerance to sulfur including, for example, sulfur added as thiophene and dibenzothiophene, which are common bulky components of crude oil that often end up in gas oil fractions.

In other various embodiments, mesoporous zeolitic materials can be used in hydrodesulfurization ("HDS"), including, for example, deep HDS and hydrodesulfurization of 4,6-dialkyldibenzothiophenes. Deep removal of sulfur species from gas oil has two main limitations: i) the very low reactivity of some sulfur species, for example, dimethyldibenzothiophenes and ii) the presence of inhibitors in the feedstocks such as, for example, $H_2S$. Deep HDS is currently done with active metal sulfides on alumina, silica/alumina, and alumina/zeolite.

Generally, during HDS the feedstock is reacted with hydrogen in the presence of an HDS catalyst. Any oxygen, sulfur, and nitrogen present in the feed is reduced to low levels. Aromatics and olefins are also reduced. The HDS reaction conditions are selected to minimize cracking reactions, which reduce the yield of the most desulfided fuel product. Hydrotreating conditions typically include a reaction temperature from about 400 to about 900° F., a pressure between 500 to 5,000 psig, a feed rate (LHSV) of 0.5 $hr^{-1}$ to 20 $hr^{-1}$ (v/v), and overall hydrogen consumption of 300 to 2,000 scf per barrel of liquid hydrocarbon feed (53.4-356 m3 $H_2/m^3$ feed).

Suitable active metal sulfides include, for example, Ni and Co/Mo sulfides. Zeolites provide strong acidity, which improves HDS of refractory sulfur species through methyl group migration. Zeolites also enhance the hydrogenation of neighboring aromatic rings. Zeolite acidity enhances the liberation of $H_2S$ from the metal sulfide increasing the tolerance of the catalyst to inhibitors. However, bulky methylated polyaromatic sulfur species are not able to access the acidic sites of conventional zeolites. In contrast, the controlled mesoporosity and strong acidity of mesoporous zeolitic materials provide accessibility to the acidic sites and acidity that allows for the deeper HDS required for meeting future environmental restrictions.

In other various embodiments, mesoporous zeolitic materials can be used in hydrocracking. Metals, including noble metals such as, for example, Ni, Co, W, and Mo, and metal compounds are commercially used in hydrocracking reactions. These metals can be supported on mesoporous zeolitic materials using the previously described methods. The mesoporous zeolitic materials including metals can be employed for hydrocracking of various feedstocks such as, for example, petrochemical and hydrocarbon feed materials.

Typically, hydrocracking involves passing a feedstock (i.e., a feed material), such as the heavy fraction, through one or more hydrocracking catalyst beds under conditions of elevated temperature and/or pressure. The plurality of catalyst beds may function to remove impurities such as any metals and other solids. The catalyst beads also crack or convert the longer chain molecules in the feedstock into smaller ones. Hydrocracking can be effected by contacting the particular fraction or combination of fractions with hydrogen in the presence of a suitable catalyst at conditions, including temperatures in the range of from about 600 to about 900° F. and at pressures from about 200 to about 4,000 psia, using space velocities based on the hydrocarbon feedstock of about 0.1 to 10 $hr^{-1}$.

As compared to conventional unmodified catalyst supports such as, for example, alumina, silica, and zeolites, the mesoporous zeolitic materials including metals allow for the hydrocracking of higher boiling point feed materials. The mesoporous zeolitic materials including metals produce a low concentration of heteroatoms and a low concentration of aromatic compounds. The mesoporous zeolitic materials including metals exhibit bifunctional activity. The metal, for example a noble metal, catalyzes the dissociative adsorption of hydrogen and the mesoporous zeolitic material provides the acidity.

The controlled pore size and controlled mesopore surface in the mesoporous zeolitic materials including metals can make the bifunctional activity more efficient as compared to a bifunctional conventional catalyst. In addition to the zeolitic acidity present in the mesoporous zeolitic materials, the controlled pore size enables larger pores that allow for a high dispersion of the metal phase and the processing of large hydrocarbons.

In other embodiments, mesoporous zeolitic materials can be used in hydroisomerization. Various metals and mixtures of metals, including, for example, noble metals such as nickel or molybdenum and combinations thereof in, for example, their acidic form, can be supported on mesoporous zeolitic materials.

Typically, hydroisomerization is used to convert linear paraffins to branched paraffins in the presence of a catalyst and in a hydrogen-rich atmosphere. Hydroisomerization catalysts useful for isomerization processes are generally bifunctional catalysts that include a dehydrogenation/hydrogenation component and an acidic component. Paraffins can be exposed to mesoporous zeolitic materials including metals and isomerized in a hydrogen flow at a temperature ranging from about 150 to about 350° C. to thereby produce branched hydrocarbons and high octane products. The mesoporous zeolitic materials including metals permit hydroisomerization of bulkier molecules than is possible with commercial conventional catalysts due, at least in part, to their controlled pore size and pore volume.

In other embodiments, mesoporous zeolitic materials can be used in the oligomerization of olefins. The controlled pore shape, pore size, and pore volume improves the selectivity properties of the mesoporous zeolitic materials. The selectivity properties, the increased surface area present in the mesopore surfaces, and the more open structure of the mesoporous zeolitic materials can be used to control the contact time of the reactants, reactions, and products inside the mesoporous zeolitic materials. The olefin can contact the mesoporous zeolitic materials at relatively low temperatures to produce mainly middle-distillate products via olefin-oligomerization reactions. By increasing the reaction temperature, gasoline can be produced as the primary fraction.

Where the mesoporous zeolitic materials are used in FCC processes, the yield of olefins production can be increased relative to FCC with conventional zeolites. The increased yield of olefins can be reacted by oligomerization in an olefin-to-gasoline-and/or-diesel process, such as, for example, MOGD (Mobile Olefins to Gas and Diesel, a process to convert olefins to gas and diesel). In addition, olefins of more complex structure can be oligomerized using the mesoporous zeolitic materials described herein.

The LPG fraction produced using mesoporous zeolitic materials has a higher concentration of olefins compared to other catalysts, including, for example, various conventional FCC catalysts, zeolites, metals oxides, and clays under catalytic cracking conditions both in fixed bed and fluidized bed reactor conditions. The mesopore size of the mesoporous zeolitic materials readily allows the cracked products to exit the mesoporous zeolitic materials. Accordingly, hydrogen transfer reactions are reduced and the undesired transformation of olefins to paraffins in the LPG fraction is reduced. In addition, over-cracking and coke formation are limited, which increases the average life time of the catalyst.

The controlled pore size, pore volume, and mesopore surfaces provide an open structure in the mesostructured zeolites. This open structure reduces the hydrogen transfer reactions in the gasoline fraction and limits the undesired transformation of olefins and naphthenes into paraffins and aromatics. As a result, the octane number (both RON and MON) of the gasoline produced using the mesoporous zeolitic materials is increased.

The acidity and the controlled mesoporosity present in the mesoporous zeolitic materials can enable their use in alkylation reactions. Specifically, olefins and paraffins react in the presence of the mesoporous zeolitic materials to produce highly branched octanes. The highly branched octane products readily exit the open structure of the mesoporous zeolitic materials, thereby minimizing unwanted olefin oligomerization.

In other embodiments, the mesoporous zeolitic materials can be used to process a petrochemical feed material to petrochemical product by employing any of a number of shape selective petrochemical and/or hydrocarbon conversion processes. In one embodiment, a petrochemical feed can be contacted with the mesoporous zeolitic material under reaction conditions suitable for dehydrogenating hydrocarbon compounds. Generally, such reaction conditions include, for example, a temperature of from about 300 to about 700° C., a pressure from about 0.1 to about 10 atm, and a WHSV from about 0.1 to about 20 $hr^{-1}$.

In other embodiments, a petrochemical feed can be contacted with the mesoporous zeolitic materials under reaction conditions suitable for converting paraffins to aromatics. Generally, such reaction conditions include, for example, a temperature of from about 300 to about 700° C., a pressure from about 0.1 to about 60 atm, a WHSV of from about 0.5 to about 400 $hr^{-1}$, and an $H_2/HC$ mole ratio of from about 0 to about 20.

In other embodiments, a petrochemical feed can be contacted with the mesoporous zeolitic materials under reaction conditions suitable for converting olefins to aromatics. Generally, such reaction conditions include, for example, a temperature of from about 100 to about 700° C., a pressure from about 0.1 to about 60 atm, a WHSV of from about 0.5 to about 400 hr-1, and an H2/HC mole ratio from about 0 to about 20.

In other embodiments, a petrochemical feed can be contacted with the mesoporous zeolitic materials under reaction conditions suitable for isomerizing alkyl aromatic feedstock components. Generally, such reaction conditions include, for example, a temperature of from about 230 to about 510° C., a pressure from about 3 to about 35 atm, a WHSV of from about 0.1 to about 200 $hr^{-1}$, and an $H_2/HC$ mole ratio of from about 0 to about 100.

In other embodiments, a petrochemical feed can be contacted with the mesoporous zeolitic materials under reactions conditions suitable for disproportionating alkyl aromatic components. Generally, such reaction conditions include, for example, a temperature ranging from about 200 to about 760° C., a pressure ranging from about 1 to about 60 atm, and a WHSV of from about 0.08 to about 20 $hr^{-1}$.

In other embodiments, a petrochemical feed can be contacted with the mesoporous zeolitic materials under reaction conditions suitable for alkylating aromatic hydrocarbons (e.g., benzene and alkylbenzenes) in the presence of an alkylating agent (e.g., olefins, formaldehyde, alkyl halides and alcohols). Generally, such reaction conditions include a temperature of from about 250 to about 500° C., a pressure from about 1 to about 200 atm, a WHSV of from about 2 to about 2,000 $hr^{-1}$, and an aromatic hydrocarbon/alkylating agent mole ratio of from about 1/1 to about 20/1.

In other embodiments, a petrochemical feed can be contacted with the mesoporous zeolitic materials under reaction conditions suitable for transalkylating aromatic hydrocarbons in the presence of polyalkylaromatic hydrocarbons. Generally, such reaction conditions include, for example, a temperature of from about 340 to about 500° C., a pressure from about 1 to about 200 atm, a WHSV of from about 10 to about 1,000 $hr^{-1}$, and an aromatic hydrocarbon/polyalkylaromatic hydrocarbon mole ratio of from about 1/1 to about 16/1.

Generally, suitable conditions for a petrochemical or hydrocarbon feed to contact the mesoporous zeolitic materials include temperatures ranging from about 100 to about 760° C., pressures ranging from above 0 to about 3,000 psig, a WHSV of from about 0.08 to about 2,000 $hr^{-1}$, and a hydrocarbon compound mole ratio of from 0 to about 100.

Application in Compound Removal

The microporosity, mesoporosity, and ion exchange properties present in the mesoporous zeolitic materials can enable removal of inorganic and organic compounds from solutions. Suitable solutions can be aqueous or organic solutions. Accordingly, the mesoporous zeolitic materials having long-range crystallinity can be employed in water treatment, water purification, pollutant removal, and/or solvent drying. Other configurations such as fixed bed, filters, and membranes can be also used in addition to the mesoporous zeolitic materials. Optionally, mesoporous zeolitic materials can be employed as additives with conventional separation means including, for example, fixed bed, filters, and membranes. The mesoporous zeolitic materials can also be substituted for other separation means in, for example, fixed bed, filters, and membranes. The mesoporous zeolitic materials can be recycled by ion exchange, drying, calcinations or other conventional techniques and reused.

Application in Adsorption

The mesoporous zeolitic materials can be used to adsorb gaseous compounds including, for example, volatile organic compounds ("VOCs"), which are too bulky to be adsorbed by conventional unmodified zeolites. Accordingly, pollutants that are too bulky to be removed by conventional unmodified zeolites can be removed from a gaseous phase by direct adsorption. Mesoporous zeolitic materials can be employed for adsorption in various adsorption configurations such as, for example, membranes, filters, and fixed beds. Adsorbed organic compounds can be desorbed from the mesoporous zeolitic materials by heat treatment. Thus, the mesoporous zeolitic materials can be recycled and then reused.

Application in Gas Separation

Mesoporous zeolitic materials can be grown on various supports by employed techniques such as, for example, seeding, hydrothermal treatment, dip coating, and/or use of organic compounds. They can be physically mixed with conventional zeolites or metal oxides. Continuous layers of mesoporous zeolitic materials can be used as membranes and/or catalytic membranes on, for example, porous supports. Mesoporous zeolitic materials are unique molecular sieves containing both microporosity and mesoporosity. They may be employed in various configurations including, for example, membranes for separation of gases based on physicochemical properties such as, for example, size, shape, chemical affinity, and physical properties.

Application in Fine Chemicals and Pharmaceuticals

A mesoporous zeolitic material has increased active site accessibility as compared to the same zeolite in conventional form. Accordingly, the activity of some important chemical reactions used in fine chemical and pharmaceutical production can be improved by substituting a conventional zeolite used in the process for a mesoporous zeolitic material. In addition, a mesoporous zeolitic material having long-range crystallinity may be employed as an additive to a catalyst typically employed in such fine chemical and pharmaceutical production reactions. Suitable processes that can be improved by using a mesoporous zeolitic material include, for example, isomerization of olefins, isomerization of functionalized saturated systems, ring enlargement reactions, Beckman rearrangements, isomerization of arenes, alkylation of aromatic compounds, acylation of arenes, ethers, and aromatics, nitration and halogenation of aromatics, hydroxyalylation of arenes, carbocyclic ring formation (including Diels-Alder cycloadditions), ring closure towards heterocyclic compounds, amination reactions (including amination of alcohols and olefins), nucleophilic addition to epoxides, addition to oxygen-compounds to olefins, esterification, acetalization, addition of heteroatom compounds to olefins, oxidation/reduction reactions such as, but not limited to, Meerwein-Ponndorf-Verley reduction and Oppenauer oxidation, dehydration reactions, condensation reactions, C—C formation reactions, hydroformylation, acetilization, and amidation.

Application in Slow Release Systems

Chemicals and/or materials having useful properties such as, for example, drugs, pharmaceuticals, fine chemicals, optic, conducting, semiconducting magnetic materials, nanoparticles, or combinations thereof, can be introduced to mesoporous zeolitic materials using one or more modifying methods. For example, chemicals and/or materials may be incorporated into the mesoporous zeolitic materials by, for example, adsorption or ion exchange. In addition, such useful chemicals can be combined with the mesoporous zeolitic materials by creating a physical mixture, a chemical reaction, heat treatment, irradiation, ultrasonication, or any combination thereof.

The release of the chemicals and/or materials having useful properties can be controlled. Controlled release may take place in various systems such as, for example, chemical reactions, living organisms, blood, soil, water, and air. The controlled release can be accomplished by physical reactions or by chemical reactions. For example, controlled release can be accomplished by chemical reactions, pH variation, concentration gradients, osmosis, heat treatment, irradiation, and/or magnetic fields.

Kits

One or more embodiments also provide kits for conveniently and effectively implementing various methods described herein. Such kits can comprise any of the mesoporous zeolitic materials described herein, and a means for facilitating their use consistent with various methods. Such kits may provide a convenient and effective means for assuring that the methods are practiced in an effective manner. The compliance means of such kits may include any means that facilitate practicing one or more methods associated with the zeolitic materials described herein. Such compliance means may include instructions, packaging, dispensing means, or combinations thereof. Kit components may be packaged for either manual or partially or wholly automated practice of the foregoing methods. In other embodiments involving kits, a kit is contemplated that includes block copolymers, and optionally instructions for their use.

EXAMPLES

The following examples are intended to be illustrative of the present invention in order to teach one of ordinary skill in the art to make and use the invention and are not intended to limit the scope of the invention in any way.

Examples 1-5 (Comparative)

Riving with Combined Ammonia-Surfactant Solution

Five rived zeolite samples were prepared using a combined surfactant/ammonia solution. $NH_4$-forms of Y zeolite, either produced by Zeolyst International (CBV300) or by Grace & Davidson Company (GD $NH_4Y$), served as the starting materials in the experiments of Examples 1-5. A 20% zeolite slurry in water was prepared for each sample and the pH for each sample was adjusted to 5.9 by drops of diluted $HNO_3$. Under agitation, a 10% citric acid solution was slowly pumped at ambient temperature into the agitated slurries. The amounts of the reagents used are based on one gram of a zeolite as-received and are detailed in Table 1. The citric acid amounts varied in the range known in the art as providing steam-stable riving products, i.e., from 2 to 3 meq/g. The final pH of the slurries after acid treatment were dropped down to 3.3 (Example 1) to 3.5 (Examples 2-5). The solids were separated by filtration and the subsequent treated cake was washed, vacuum-dried, and dispersed at 80° C. in a 15% solution of cetyltrimethyl ammonium chloride ("CTAC") or cetyltrimethyl ammonium bromide ("CTAB"). Concentrated ammonium hydroxide solution was added to the slurries after 15 to 30 minutes of agitation. The agitation was stopped shortly and the slurries were held for 16 to 18 hours in a capped vessel in an oven at 80° C. The final pH of the liquid phase of the slurries was 9.8 to 10.0.

The precipitate was separated by filtration and then washed, dried, and calcined at 560° C. for 2 hours under an atmosphere of 10% $NH_3$ and 90% water followed by 1 hour under $N_2$ and 1 hour under air. The product of the calcinations was $NH_4$-exchanged in a $NH_4NO_3$ solution having a residual $Na_2O$ concentration of 0.1 to 0.3% (on an anhydrous base). These calcined-exchanged products are referred to in Table 1 as "fresh." All the "fresh" rived samples were also steam-deactivated under conditions of 1450° F. (788° C.) and 100% water vapor for 8 hours. These samples are referred to in Table 1 as "steamed."

The pore size distributions ("POSD") and pore volume for the "fresh" and "steamed" samples were calculated by measuring argon adsorption at a temperature of 80 K with a Quadrasorb SI instrument from Quantachrome. The measurements were analyzed by the Density Functional Theory ("DFT") to determine pore volume and POSD. The relationships between the volumes of micropores in the 0 to 20 Å diameter range and the volumes of mesopores in the 20 to 135 Å diameter range are given in Table 1. The bulk mole silica-alumina ratio ("SAR") for each sample was analyzed by X-ray fluorescence ("XRF") with an AXious X-ray fluorescence analyser from Pananalytical. As seen in Table 1, below, the bulk mole silica-alumina ratio increased from 6.0 to 7.1 with citric acid meq growth from 2 to 3. Unit cell size ("UCS") was calculated from X-ray diffraction ("XRD") patterns recorded on a CubiXPRO X-ray diffractometer from Pananalytical using CuKα radiation at 45 KV. The UCS varied for "fresh" samples in the range of from 24.46 to 24.49 Å. The UCS of steamed samples fluctuated at around an average value of 24.23±0.01 Å. Analysis results for Examples 1-5 are provided in Table 1, below.

Examples 6-16 (Comparative)

Riving with Combined Caustic-Surfactant Solution

In Examples 6-16, the starting zeolite was CBV300 and CTAB was used as the surfactant. For preparation of Examples 6-16, a combined solution of CTAB and NaOH was used. The amount of NaOH varied as indicated in Table 2, below, from 0.9 to 4 mmole of NaOH per g of the zeolite (as-received). The citric acid treatment was carried out using the same procedure described in Examples 1-5. Instead of ammonium hydroxide, a caustic solution was employed.

TABLE 1

| Example | Starting Zeolite | Citric Acid (meq/g) | Combined Solution Surfactant (g) | $NH_4OH$ (g) | Fresh or Steamed | Ar-POSD Micropore Volume (cc/g) | Ar-POSD Mesopore Volume (cc/g) | UCS (Å) | Bulk SAR |
|---|---|---|---|---|---|---|---|---|---|
| 1 | CBV300 | 2 | CTAB, 0.4 | 8 | Fresh | 0.296 | 0.133 | 24.480 | 5.96 |
|   |        |   |           |   | Steamed | 0.178 | 0.134 | 24.241 |   |
| 2 | GD | 2.25 | CTAC, 0.4 | 8 | Fresh | 0.299 | 0.162 | 24.468 | 6.46 |
|   |    |      |           |   | Steamed | 0.199 | 0.141 | 24.237 |   |
| 3 | GD | 2.5 | CTAC, 0.4 | 8 | Fresh | 0.251 | 0.127 | 24.490 | 6.48 |
|   |    |     |           |   | Steamed | 0.174 | 0.143 | 24.236 |   |
| 4 | GD | 2.75 | CTAC, 0.4 | 8 | Fresh | 0.266 | 0.158 | 24.484 | 6.57 |
|   |    |      |           |   | Steamed | 0.182 | 0.158 | 24.234 |   |
| 5 | GD | 3 | CTAC, 0.4 | 8 | Fresh | 0.216 | 0.183 | 24.46 | 7.07 |
|   |    |   |           |   | Steamed | 0.12 | 0.171 | 24.224 |   |

Results for Example 5 in Table 1 and the corresponding data points in FIG. 1 indicate that the increase of citric acid to 3 meq/g leads to a significant loss of micropore volume in the steamed sample and a pronounced dealumination (SAR=7.07). Thus, it would be reasonable to conclude that the parameters of Example 5 are not optimal.

Optimal results were achieved in Examples 1-4. Their area is circled in FIG. 1. The steamed products inside this area are characterized by following properties:

(a) an average 0-20 Å micropore volume of 0.183 cc/g;
(b) an average 20-135 Å mesopore volume of 0.144 cc/g;
(c) a UCS range of 24.237±0.003 Å; and
(d) a bulk SAR range of 6.0-6.6.

Total duration of riving at 80° C. with CTAB and caustic solution was the same as during the riving in Examples 1-5 (i.e., 16 to 18 hours).

Filtration and washing of the Na-enriched rived precipitates was very slow. After separation, the precipitates were $NH_4$-exchanged with a $NH_4NO_3$ solution, calcined, and $NH_4$-exchanged again to a residual soda level of 0.1 to 0.3%.

The calcination was conducted under somewhat more severe conditions than the calcinations in Examples 1-5. Products after the first $NH_4$-exchange were heated under a 100% water vapor atmosphere to 650° C., held at 650° C. for half an hour, cooled to 550° C., held at that temperature for 1 hour under $N_2$, and then held at that temperature for 1 hour under air flow. The resulting products were analyzed according to the same procedures described above in Examples 1-5; the corresponding results are provided in Table 2, below.

TABLE 2

| Example # | Comment | Citric Acid Meq per g of Zeolite, Final pH = 3.2-3.4 | Combined Solution CTAB, g per g of Zeolite | Combined Solution Mmole of NaOH per g of Zeolite | Rived Product: Final pH | Fresh/ Steamed | Ar-POSD 0-20 Å Micro-Pore Volume | Ar-POSD 20-135 Å Meso-Pore Volume | UCS, Å | Bulk SAR |
|---|---|---|---|---|---|---|---|---|---|---|
| 6 | Low-Alkalinity Range | 3 | 0.45 | 0.9 | 8.6 | Fresh | 0.198 | 0.192 | 24.380 | 6.56 |
|   |   |   |      |     |     | Steamed | 0.094 | 0.148 | 24.213 |   |
| 7 |   | 3 | 0.45 | 1.3 | 9.3 | Fresh | 0.208 | 0.175 | 24.384 | 6.58 |
|   |   |   |      |     |     | Steamed | 0.126 | 0.189 | 24.210 |   |
| 8 |   | 3.5 | 0.45 | 0.9 | 9.1 | Fresh | 0.19 | 0.231 | 24.374 | 6.97 |
|   |   |     |      |     |     | Steamed | 0.091 | 0.184 | 24.212 |   |
| 9 |   | 3.5 | 0.45 | 1.3 | 9.7 | Fresh | 0.168 | 0.208 | 24.389 | 6.88 |
|   |   |     |      |     |     | Steamed | 0.089 | 0.203 | 24.197 |   |
| 10 |   | 3.5 | 0.45 | 1.8 | 9.8 | Fresh | 0.176 | 0.221 | 24.389 | 6.92 |
|    |   |     |      |     |     | Steamed | 0.083 | 0.153 | 24.223 |   |
| 11 | High-Alkalinity Range | 3 | 0.45 | 2.2 | 9.9 | Fresh | 0.274 | 0.221 | 24.413 | 6.50 |
|    |   |   |      |     |     | Steamed | 0.160 | 0.194 | 24.223 |   |
| 12 |   | 3 | 0.45 | 2.5 | 10.9 | Fresh | 0.250 | 0.227 | 24.426 | 6.47 |
|    |   |   |      |     |      | Steamed | 0.162 | 0.189 | 24.243 |   |
| 13 |   | 3 | 0.45 | 3 | 10.4 | Fresh | 0.226 | 0.2 | 24.420 | 6.04 |
|    |   |   |      |   |      | Steamed | 0.151 | 0.154 | 24.211 |   |

TABLE 2-continued

| Example # | Comment | Citric Acid Meq per g of Zeolite, Final pH = 3.2-3.4 | Combined Solution | | Rived | | Ar-POSD | | | |
|---|---|---|---|---|---|---|---|---|---|---|
| | | | CTAB, g per g of Zeolite | Mmole of NaOH per g of Zeolite | Final pH | Product: Fresh/ Steamed | 0-20 Å Micro-Pore Volume | 20-135 Å Meso-Pore Volume | UCS, Å | Bulk SAR |
| 14 | | 3 | 0.45 | 4 | 11.4 | Fresh | 0.246 | 0.207 | 24.431 | 5.76 |
| | | | | | | Steamed | 0.157 | 0.188 | 24.231 | |
| 15 | | 3.1 | 0.45 | 2.7 | 10.8 | Fresh | 0.248 | 0.197 | 24.441 | 6.22 |
| | | | | | | Steamed | 0.155 | 0.183 | 24.229 | |
| 16 | | 3.2 | 0.45 | 2.7 | 10.7 | Fresh | 0.225 | 0.201 | 24.417 | 6.13 |
| | | | | | | Steamed | 0.147 | 0.177 | 24.219 | |

As can be seen in Table 2, the higher temperature calcinations (i.e., 650° C.) resulted in a more significant drop in the UCS of the fresh samples. In samples rived with less caustic (i.e., Examples 6-10 in Table 2), the UCS came down to 24.37 to 24.39 Å, whereas the UCS ranged from 24.41 to 24.44 Å in the products of Examples 11-16, which were produced using higher amounts of caustic (i.e., the high-alkalinity range in Table 2). Thus, the UCS range of Examples 6-16 was lower than the products in Examples 1-5 (i.e., 24.46 to 24.49 Å; Table 1), which were calcined at 560° C.

However, after steaming at 1450° F. (788° C.) for 8 hours, the gap in UCS numbers, originally caused by a difference in calcinations parameters, practically disappeared. The steamed products of Examples 11-16 showed roughly the same UCS (i.e., an average of 24.23 Å) as those of Examples 1-5 in Table 1.

Figure 2:
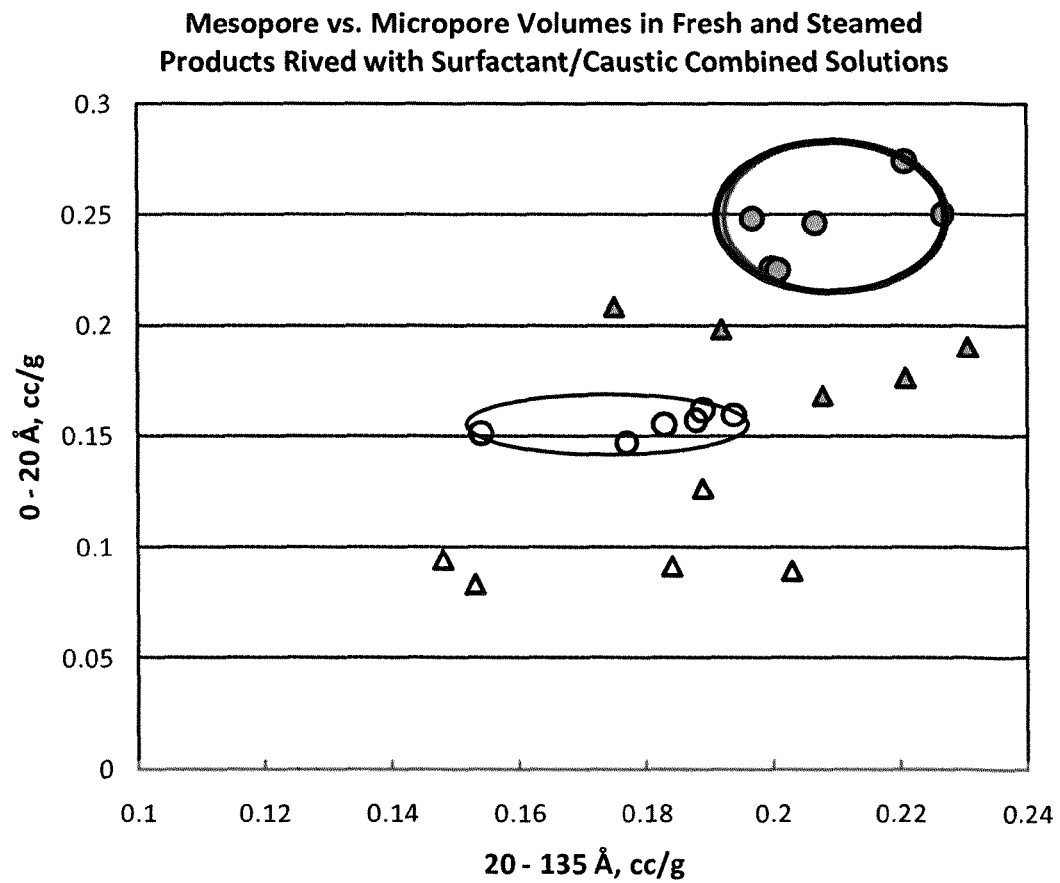
FIG. 2 is a graph comparing the mesopore volumes and micropore volumes for the samples prepared in Examples 6-16, where the circled data points are populations of "Fresh" and "Steamed" products treated on a riving stage with more than 2 mmole of caustic per zeolite gram (i.e., Examples 11-16)

As can be seen in FIG. 2, the variation in the amounts of riving caustic produced clearly visible effects on pore volume properties. Those samples rived with less than 2 mmole of NaOH per g of zeolite are referred to as the "low-alkalinity range" samples in Table 2, while the samples rived with more than 2 mmole of NaOH/g are referred to as the "high-alkalinity range" samples. The alkalinity threshold could be drawn approximately at 2 mmole of NaOH per g of zeolite (see FIG. 2 and Table 2). Samples from opposite sides of the threshold are circled in FIG. 2. The pH of the riving solution in the low-alkalinity range was below 10, while the pH of the riving solution in the high-alkalinity range was about 10 to 11.4.

Gaps in micropore volumes between the samples in the low-alkalinity range and high-alkalinity range are significant. Micropore volumes in the fresh and steamed samples from the high-alkalinity range can be more than 0.05 cc/g higher than their low-alkalinity counterparts (FIG. 2).

The steamed products of the high-alkalinity riving (Examples 11-16) possess a combination of properties that can be considered as optimal:
  (a) an average 0-20 Å micropore volume of 0.155 cc/g, which is a decrease of 15% in comparison to Examples 1-4 that use the $NH_4OH$ route;
  (b) an average 20-135 Å mesopore volume of 0.181 cc/g, which is an increase of 26% in comparison to Examples 1-4 that use the $NH_4OH$ route;
  (c) an average UCS of 24.226±0.011 Å; and
  (d) a bulk composition SAR range of 5.8-6.5.

In Table 2 and FIG. 2, the results show that an increased caustic amount of above 2 mmole of NaOH in the riving solution brings about a significant boost in micropore retention in fresh as well as steamed samples. Additionally, the use of caustic produced a significant expansion of mesopore volume in rived products, compared with the use of ammonia in Examples 1-5.

Examples 17-32 (Inventive)

Riving with Split Caustic and Surfactant Solutions

In Examples 17-32, CBV300 zeolite was used as the starting material and CTAB was used as the surfactant. The starting zeolites were subjected to the citric acid pretreatment as described in Examples 1-5. As shown in Table 3, below, the final pH of the zeolite slurry after acid treatment was 3.2 to 3.4. Following acid treatment, the zeolite was washed with water and vacuum dried. Afterwards, a solution of CTAB and a NaOH solution were applied separately to the acid-pretreated zeolites.

A 6.5% CTAB solution having a pH of 5.5 was heated up to 80° C. The acid-treated zeolite was then dispersed in the CTAB solution and the pH was dropped to 3.7 to 4.1. The solid was agitated in this solution at 80° C. for 0.5 to 3 hours. The duration of agitation appeared to have no effect on the results.

The CTAB-treated solid was filtered off from the solution without washing. Weight loss in the 350 to 550° C. interval by TGA showed that the solid contained 7 to 16% of cetyltrimethyl ammonium cation ("$CTA^+$") (on anhydrous base), while bromide anion was likely left behind in solution.

The wet, vacuum-dried, CTA-loaded precipitate was dispersed in a caustic solution at 80° C. The amount of NaOH varied as indicated in Table 3 from 0.9 to 4 mmole of NaOH per g of the zeolite (as-received). This was the same range that was used for the combined surfactant/caustic experiments in Examples 6-16. The total duration of the split caustic treatment at 80° C. was also similar to the riving duration employed in the combined route (i.e., 16 to 18 hours).

Thereafter, the mixture was filtered and washed with water. Filtration and washing of Na-enriched rived precipitate did not cause any problems. TGA indicated that CTA contents after caustic treatment were no more than 1-2% less than the contents before NaOH treatment. After separation, the precipitate was $NH_4$-exchanged with a $NH_4NO_3$ solution. Then it was calcined and $NH_4$-exchanged again to a residual soda level ($Na_2O$) of 0.1-0.3%.

The calcination was conducted under conditions identical to the calcinations of in Examples 6-16. The products after the first $NH_4$-exchange were heated in a 100% water vapor atmosphere to 650° C., held at 650° C. for 30 minutes, cooled to 550° C., held at that temperature for 1 hour under $N_2$, and then 1 hour at the same temperature under air flow.

TABLE 3

| Example # | Comment | Citric Acid Treatment | | Split Surfactant Loading | | Split Caustic Treatment | | Rived Product: Fresh/ Steamed | Ar-POSD | | UCS, Å | Bulk SAR |
|---|---|---|---|---|---|---|---|---|---|---|---|---|
| | | Meq per g of Zeolite | Final pH | CTAB, g per g of Zeolite | pH | Mmole of NaOH per g of Zeolite | pH | | 0-20 Å Micro-Pore Volume, cc/g | 20-135 Å Meso-Pore Volume, cc/g | | |
| 17 | Low-Alkalinity | 3 | 3.3 | 0.45 | 3.9 | 0.9 | 8.3 | Fresh | 0.183 | 0.217 | 24.356 | 6.51 |
| | | | | | | | | Steamed | 0.088 | 0.183 | 24.236 | |
| 18 | Range | 3 | 3.3 | 0.45 | 4.0 | 1.3 | 9.2 | Fresh | 0.207 | 0.192 | 24.392 | 6.5 |
| | | | | | | | | Steamed | 0.128 | 0.197 | 24.217 | |
| 19 | | 3 | 3.4 | 0.45 | 3.9 | 1.8 | 9.7 | Fresh | 0.223 | 0.192 | 24.421 | 6.45 |
| | | | | | | | | Steamed | 0.132 | 0.187 | 24.227 | |
| 20 | | 3.5 | 3.2 | 0.45 | 4.2 | 0.9 | 9.3 | Fresh | 0.189 | 0.229 | 24.383 | 6.84 |
| | | | | | | | | Steamed | 0.074 | 0.165 | 24.232 | |
| 21 | | 3.5 | 3.2 | 0.45 | 3.7 | 1.3 | 10.2 | Fresh | 0.181 | 0.226 | 24.389 | 6.87 |
| | | | | | | | | Steamed | 0.077 | 0.157 | 24.196 | |
| 22 | | 3.5 | 3.2 | 0.45 | 3.8 | 1.8 | 10.6 | Fresh | 0.198 | 0.214 | 24.377 | 6.76 |
| | | | | | | | | Steamed | 0.12 | 0.178 | 24.213 | |
| 23 | High-Alkalinity | 2.75 | 3.4 | 0.45 | 4.0 | 2.7 | 11.5 | Fresh | 0.286 | 0.177 | 24.444 | 5.79 |
| | | | | | | | | Steamed | 0.186 | 0.187 | 24.236 | |
| 24 | Range | 2.8 | 3.4 | 0.45 | 3.9 | 2.7 | 10.8 | Fresh | 0.226 | 0.196 | 24.438 | 5.81 |
| | | | | | | | | Steamed | 0.165 | 0.209 | 24.226 | |
| 25 | | 3 | 3.3 | 0.45 | 4.1 | 2.2 | 10.6 | Fresh | 0.23 | 0.218 | 24.428 | 6.16 |
| | | | | | | | | Steamed | 0.144 | 0.208 | 24.210 | |
| 26 | | 3 | 3.3 | 0.45 | 3.9 | 2.7 | 10.5 | Fresh | 0.278 | 0.235 | 24.427 | 5.94 |
| | | | | | | | | Steamed | 0.152 | 0.182 | 24.227 | |
| 27 | | 3 | 3.3 | 0.45 | 4.0 | 3.1 | 10.8 | Fresh | 0.235 | 0.225 | 24.435 | 5.70 |
| | | | | | | | | Steamed | 0.166 | 0.218 | 24.220 | |
| 28 | | 3 | 3.2 | 0.45 | 4.0 | 3.6 | 11.7 | Fresh | 0.241 | 0.22 | 24.449 | 5.61 |
| | | | | | | | | Steamed | 0.157 | 0.194 | 24.221 | |
| 29 | | 3 | 3.2 | 0.45 | 3.9 | 4 | 11.9 | Fresh | 0.241 | 0.2 | 24.462 | 5.49 |
| | | | | | | | | Steamed | 0.158 | 0.186 | 24.228 | |
| 30 | | 3.5 | 3.3 | 0.45 | 4.0 | 3.1 | 11.6 | Fresh | 0.198 | 0.233 | 24.451 | 5.9 |
| | | | | | | | | Steamed | 0.158 | 0.250 | 24.231 | |
| 31 | | 3.5 | 3.2 | 0.45 | 3.9 | 4 | 11.9 | Fresh | 0.247 | 0.266 | 24.460 | 5.66 |
| | | | | | | | | Steamed | 0.147 | 0.214 | 24.216 | |
| 32 | | 4 | 3.2 | 0.45 | 3.8 | 4 | 11.9 | Fresh | 0.22 | 0.189 | 24.442 | 5.83 |
| | | | | | | | | Steamed | 0.139 | 0.2315 | 24.218 | |

Figure 3:
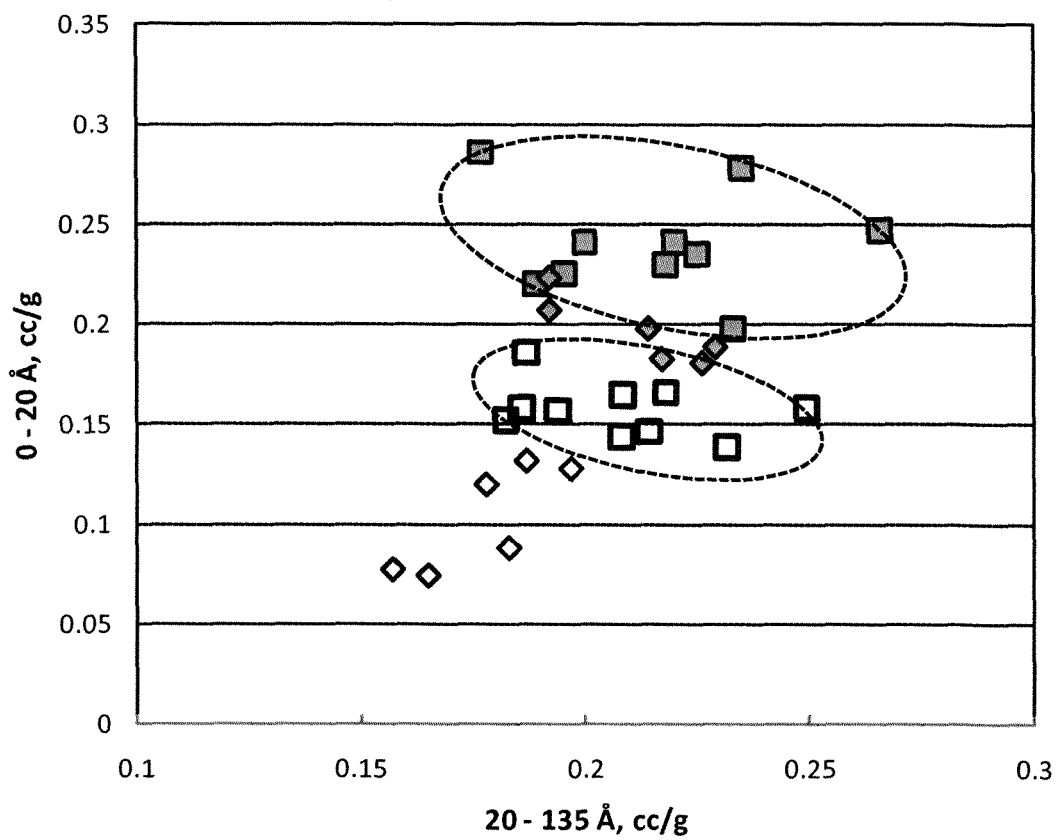
FIG. 3 is a graph comparing the mesopore volumes and micropore volumes for the samples prepared in Examples 17-32, where the circled data points are populations of "Fresh" and "Steamed" products originated from the high-alkalinity split riving (i.e., Examples 23-32)

Variation in the amount of applied caustic produced a distinct effect on pore volume properties, as can be seen in FIG. 3. The effect is analogous to that observed during the combined riving in Examples 6-16.

In split riving, the threshold could also be drawn at approximately 2 mmole of NaOH, as shown in Table 3. Samples from opposite sides of the threshold are shown separately and circled in FIG. 3. Those rived with less than 2 mmole/g of NaOH are referred to as the "low-alkalinity range" samples, while the samples rived with more than 2 mmole of NaOH are referred to as the "high-alkalinity range" samples in Table 3.

The pH variations are correlated with the increase in alkalinity in the split process (i.e., Examples 17-32), which is similar to what was observed in the combined process (i.e., Examples 6-16). However, the pH values are somewhat higher in Examples 17-32 due to the separation of the acid and surfactant solutions from the basic "healing" solution. For example, the pH of the low-alkalinity range samples in the split process can exceed 10 (Table 3; e.g., Examples 21 and 22). Consequently, this is higher than the pH of the low-alkalinity range samples in the combined process (e.g., less than 10). The pH of the high-alkalinity range samples in the split process were under 12 as shown in Table 3.

The gap in micropore volumes between the low-alkalinity and high-alkalinity range samples is evident in FIG. 3. In FIG. 3 it can be seen that the micropore volumes of the "fresh" samples from the high-alkalinity range are at average more than 0.05 cc/g higher than their "fresh" counterparts in the low-alkalinity range. In addition, as shown in FIG. 3, the "steamed" low-alkalinity range samples clearly demonstrate the degradation of microporosity, also known as the "boomerang" phenomena.

The steamed products of the high-alkalinity range (i.e., Examples 23-32) possess a combination of properties that can be considered as optimal for the split process:
  (a) an average 0-20 Å micropore volume of 0.157 cc/g, which is a decrease of 14% in comparison to Examples 1-4 for the NH$_4$OH route;
  (b) an average 20-135 Å mesopore volume of 0.208 cc/g, which is an increase of 44% in comparison to Examples 1-4 for the NH$_4$OH route;
  (c) an UCS of 24.223±0.008 Å; and
  (d) a bulk composition SAR in the range of 5.2-6.2.

The somewhat decreased SAR in Examples 23-32 reflects a deeper desilication associated with the split-caustic riving.

Figure 4:
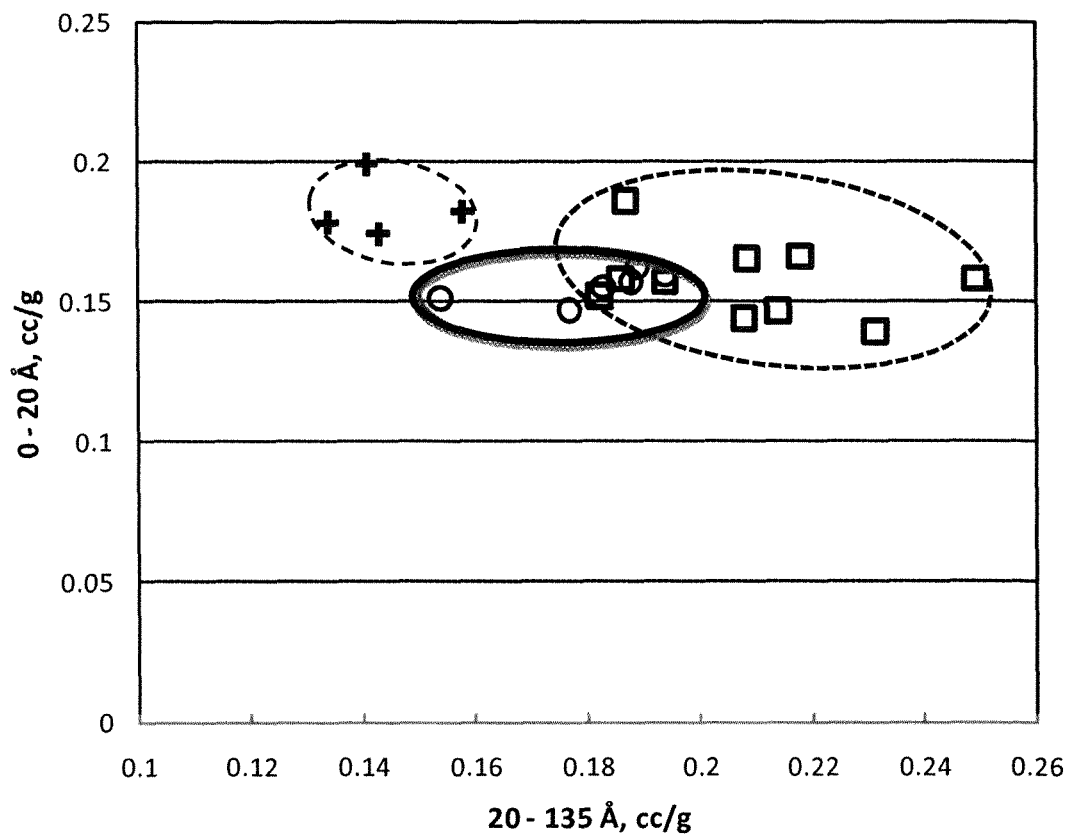
FIG. 4 is a graph comparing mesopore volume variations in the steamed products of Examples 1-4, Examples 11-16, and Examples 23-32, particularly illustrating the increased mesoporosity of Examples 23-32.

Tables 2 and 3 along with FIGS. 2-4 confirm that an increased caustic amount of above 2 mmole of NaOH during riving brings about a significant boost in the micropore retention in the fresh and steamed samples. Additionally, the caustic treatment leads to higher mesopore volumes in the rived products.

Accordingly, several conclusions can be drawn from Examples 1-32, such as:
  1) The caustic treatment increases the mesopore volume in the caustic-rived products. This effect is explicitly demonstrated in FIGS. 2 and 3.
  2) As shown in FIG. 4, the effect of the caustic treatment is considerably more pronounced when the split caustic process is applied as in Examples 23-32.

3) In the split caustic process (i.e., Examples 17-32), a substantial gain in mesopore volume is accompanied by a small loss in micropore volume.
4) The surfactant can be loaded onto the riving solid in an acid solution environment.
5) The split process (i.e., Examples 17-32) allows for a more effective usage of the basic agent and also resolves filtration problems in caustic riving.
6) All of the steamed samples depicted in FIG. 4, which were steamed at 1450° F. (788° C.) for 8 hours and show the optimal combination of micropore and mesopore volumes, have a UCS range of from 24.22-24.24 Å. This UCS range was independent of the chosen riving method and applied to all three of the riving processes described above.
7) The bulk SAR decrease observed in the examples above indicates that the increase in alkalinity intensified the desilication of the solid composition.

Example 33 (Comparative)

Microporosity and Mesoporosity in USY Zeolite

In this example, an ultra-stable zeolite Y was analyzed in order to serve as a reference of comparison for comparing the mesoporosity of the treated zeolitic materials generated by the present invention. This ultra-stable zeolite Y was produced by Zeolyst International (CBV500). The CBV500 was analyzed in the "as-received" form and in the "steamed" form after it had been subjected to steam deactivation at a temperature of 788° C. (1,450° F.) in an atmosphere of 100% steam for 8 hours. The pore volume, POSD, UCS, and bulk SAR were measured using the same procedures as outlined in Examples 1-5. In addition, crystallinity percent was calculated from X-ray diffraction ("XRD") patterns recorded on a CubiXPRO X-ray diffractometer from Pananalytical using CuKα radiation at 45 KV. The "as-received" CBV500 was chosen as the 100% crystallinity standard. Residual soda ($Na_2O$) was also calculated by XRF with an AXious X-ray fluorescence analyser from Pananalytical. Properties of the "as-received" and "steamed" CBV500 are depicted in Table 4.

TABLE 4

| Sample | Pore Volume, cc/g | | XRD Characterization | | XRF Analyses | |
|---|---|---|---|---|---|---|
| | Micro-Pores: 0-20 Å | Meso-Pores: 20-300 Å | UCS, Å | Crystallinity, % (CBV500 base) | Bulk SAR | Na2O, % |
| CBV500: as-Received | 0.344 | 0.074 | 24.547 | 100 | 5.6 | 0.2 |
| CBV500: Steamed | 0.235 | 0.112 | 24.292 | 72 | | |

Examples 34-38 (Inventive)

Riving with Varying Acid Amounts and Sequential Base Treatment with High NaOH Dosage (2.8 mmol/g)

In Examples 34-38, the sodium forms of zeolite Y (CBV100) were used as the starting material. The CBV100 was diluted with deionized water to produce 20% zeolite slurries. The pH of the 20% zeolite slurries was then adjusted to 5.9 by drops of diluted $HNO_3$ before adding a 10% citric acid solution. The 10% citric acid solution was slowly pumped at ambient temperature into the agitated slurries. As shown in Table 5, the citric acid amounts varied for each sample in the range of from 2.5 to 4 meq/g. The final pH in the slurry after the acid treatment was in the range of 3.6 (Example 34) to 3.3 (Example 35).

The modified zeolite generated during the acid treatment was separated from the solution with a Buchner funnel and washed three times with 500 mL of room-temperature deionized water to produce an acid-modified zeolite filter cake. The wet acid-modified zeolite filter cake had a weight that was almost double that of the original zeolite before acid treatment. The acid-modified zeolite filter cake was then washed and vacuum-dried. Afterwards, at least 90% of the vacuum-dried cakes were dispersed at 80° C. in a solution of 40 g of cetyltrimethyl ammonium bromide ("CTAB") and 360 g of deionized water to produce a modified zeolite slurry. The ratio of surfactant to nominal zeolite was 1.2 mmole per g and the pH of the modified zeolite slurry in surfactant solution was 3.6.

The CTAB-treated cake was filtered off from the solution without washing. About 10% of the cake was taken for weight loss analysis and dried at 80° C. The weight loss in the 350 to 550° C. interval by TGA showed adsorption on the solid of about 0.4 mmole of cetyltrimethyl ammonium cation ("CTA+") (on anhydrous base) per g of nominal starting zeolite (from original 1.2 mmole/g).

The remaining unwashed cake was suspended at 80° C. in a caustic solution containing 491 g of deionized water and 9 g of NaOH. Therefore, the ratio of sodium hydroxide mmole per g of zeolite was 2.8. The slurry was agitated at 80° C. for 2 hours and then left in a capped polyethylene bottle at 80° C. for overnight (18 hours) without agitation. The final pH of the caustic slurry in Examples 34-38 ranged from 10.9 to 10.3.

Thereafter, the solid was settled and the mixture was filtered and washed with water. A small portion of the resulting cake was dried at 80° C. and analyzed by TGA. Calculation of weight loss at the 350-550° C. range showed that the $CTA^+$-cation content in the cake decreased to 0.2 mmole/g.

In order to decrease the soda concentration in the modified zeolite before stabilization, the main portion of the still wet vacuum-filtered cake was subjected twice to ammonium exchange at 80° C. for 30 minutes in a solution of 70 g $NH_4NO_3$ and 530 g of deionized water. The pH of the modified zeolite slurry in the $NH_4^+$-solution was adjusted to 4 at the start of exchange by utilizing drops of 10% $HNO_3$. After each exchange the product was washed twice with hot water on a Buchner funnel. The $Na_2O$ content was reduced in this stage to about 3% (anhydrous base).

After the ammonium exchange, the wet cake was dried at 80° C. and then stabilized by heat treating under 100% $H_2O$ vapor at 560° C. for 2 hours, followed by one hour under $N_2$ flow at 560° C. and one hour at 560° C. under air flow.

After cooling, the product was once again subjected twice to ammonium exchange at 80° C. for 30 minutes. During this stage, the pH of the product slurry in the $NH_4^+$-nitrate solution was adjusted to 4 by utilizing drops of 10% $NH_4OH$. The resultant ammonium-exchanged, stabilized zeolites are referred to as "Fresh." As shown in Table 5, the $Na_2O$ contents of the fresh products ranged from 0.1% to 0.2%.

Finally, each of the examples was steam deactivated at a temperature of 788° C. (1,450° F.) in an atmosphere of 100% steam for 8 hours. These products are referred to as "Steamed." The pore volume, UCS, crystallinity %, bulk SAR, and residual $Na_2O$ were measured according to the procedures outlined in Examples 1-5 and 33. The measured properties of the "Fresh" and "Steamed" products of Examples 34-38 are depicted in Table 5.

After separation from the solution by filtration without washing, the surfactant-treated zeolites were suspended in a caustic solution of 7 g NaOH in 493 g water. The resulting

TABLE 5

| Preparation | | | Pore Volume, cc/g | | XRD Characterization | | XRF Analyses | |
|---|---|---|---|---|---|---|---|---|
| Ex. # | Citric Acid Meq | Stage | Micro-Pores: 0-20 Å | Meso-Pores: 20-300 Å | UCS, Å | Crystallinity % (CBV500 base) | Bulk SAR | Na2O, % |
| 34 | 2.5 | Fresh | 0.297 | 0.092 | 24.544 | 95 | 5.53 | 0.1 |
|  |  | Steamed | 0.21 | 0.167 | 24.261 | 84 |  |  |
| 35 | 2.75 | Fresh | 0.35 | 0.142 | 24.534 | 95 | 5.49 | 0.1 |
|  |  | Steamed | 0.207 | 0.164 | 24.259 | 81 |  |  |
| 36 | 3 | Fresh | 0.362 | 0.139 | 24.556 | 89 | 5.46 | 0.2 |
|  |  | Steamed | 0.217 | 0.223 | 24.250 | 74 |  |  |
| 37 | 3.5 | Fresh | 0.313 | 0.159 | 24.548 | 90 | 5.45 | 0.2 |
|  |  | Steamed | 0.193 | 0.179 | 24.249 | 73 |  |  |
| 38 | 4 | Fresh | 0.326 | 0.27 | 24.525 | 74 | 6.13 | 0.1 |
|  |  | Steamed | 0.169 | 0.222 | 24.238 | 58 |  |  |

Examples 39-44 (Inventive)

Riving with Varying Acid Amounts and Sequential Base Treatment with Medium NaOH Dosage (1.9 mmol/g)

In Examples 39-44, the amount of citric acid used in the acid treatment step was varied. In Examples 39-44, the sodium forms of zeolite Y (CBV100) were used as the starting material. The zeolites of Examples 39-44 were subjected to the acid treatment procedures outlined in Examples 34-38. As shown in Table 6, the citric acid amounts varied for each sample in the range of from 2.5 to 4 meq/g.

The resulting acid-treated zeolites were subjected to the same surfactant treatment as outlined in Examples 34-38, except that the acid-treated zeolites were dispersed in a surfactant solution of 45 g CTAB and 405 g of deionized water thereby giving a ratio of CTAB to nominal zeolite of 1.2 mmole/g.

ratio of NaOH to nominal zeolite was 1.9 mmole/g. The surfactant-treated zeolites were then subjected to the same caustic, ammonium, and steam treatments as outlined in Examples 34-38.

The pore volume, UCS, crystallinity %, bulk SAR, and residual $Na_2O$ were measured according to the procedures outlined in Examples 1-5 and 33. The measured properties of the "Fresh" and "Steamed" products of Examples 39-44 are depicted in Table 6.

TABLE 6

| Preparation | | | Pore Volume, cc/g | | XRD Characterization | | XRF Analyses | |
|---|---|---|---|---|---|---|---|---|
| Example | Citric Acid Meq | Stage | Micro-Pores: 0-20 Å | Meso-Pores: 20-300 Å | UCS, Å | Crystallinity % (CBV500 base) | Bulk SAR | Na2O, % |
| 39 | 2.5 | Fresh | 0.374 | 0.145 | 24.526 | 94 | 5.81 | 0.2 |
|  |  | Steamed | 0.272 | 0.191 | 24.253 | 75 |  |  |
| 40 | 2.75 | Fresh | 0.378 | 0.228 | 24.545 | 90 | 6.14 | 0.1 |
|  |  | Steamed | 0.262 | 0.17 | 24.252 | 80 |  |  |
| 41 | 3 | Fresh | 0.366 | 0.193 | 24.520 | 85 | 5.98 | 0.1 |
|  |  | Steamed | 0.228 | 0.199 | 24.250 | 77 |  |  |
| 42 | 3 | Fresh | 0.332 | 0.143 | 24.531 | 88 | 5.76 | 0.1 |
|  |  | Steamed | 0.229 | 0.184 | 24.247 | 74 |  |  |
| 43 | 3.5 | Fresh | 0.356 | 0.292 | 24.509 | 78 | 6.67 | 0.1 |
|  |  | Steamed | 0.202 | 0.215 | 24.253 | 61 |  |  |
| 44 | 4 | Fresh | 0.347 | 0.321 | 24.495 | 75 | 6.70 | 0.1 |
|  |  | Steamed | 0.224 | 0.241 | 24.253 | 61 |  |  |

Examples 45-48 (Inventive)

Riving with Varying Acid Amounts and Sequential Base Treatment with Low NaOH Dosage (1.25 mmol/g)

In Examples 45-48, the amount of citric acid used in the acid treatment step was varied. In Examples 45-48, the sodium forms of zeolite Y (CBV100) were used as the starting material. The zeolites of Examples 45-48 were subjected to the acid treatment procedures outlined in Examples 34-38. As shown in Table 7, the citric acid amounts varied for each sample in the range of from 2.5 to 4.5 meq/g.

The resulting acid-treated zeolites were subjected to the same surfactant treatment as outlined in Examples 34-38, except that that the acid-treated zeolites were dispersed in a surfactant solution of 45 g CTAB and 405 g of water, thereby giving a ratio of CTAB to nominal zeolite of 1.2 mmole/g.

After separation from the solution by filtration without washing, the surfactant-treated zeolites were suspended in a caustic solution of 5 g NaOH in 493 g water. The resulting ratio of NaOH to nominal zeolite was 1.25 mmole/g. The surfactant-treated zeolites were then subjected to the same caustic, ammonium, and steam treatments as outlined in Examples 34-38.

The pore volume, UCS, crystallinity %, bulk SAR, and residual $Na_2O$ were measured according to the procedures outlined in Examples 1-5 and 33. The measured properties of the "Fresh" and "Steamed" products of Examples 45-48 are depicted in Table 7.

TABLE 7

| Preparation | | Pore Volume, cc/g | | XRD Characterization | | XRF Analyses | |
|---|---|---|---|---|---|---|---|
| | | | | | Crystallinity | | |
| Ex. # | Citric Acid Meq | Stage | Micropores: 0-20 Å | Mesopores: 20-300 Å | UCS, Å | % (CBV500 base) | Bulk SAR | $Na_2O$, % |
| 45 | 2.5 | Fresh | 0.354 | 0.122 | 24.532 | 92 | 5.74 | 0.2 |
| | | Steamed | 0.292 | 0.187 | 24.251 | 79 | | |
| 46 | 2.75 | Fresh | 0.382 | 0.123 | 24.526 | 92 | 5.94 | 0.1 |
| | | Steamed | 0.306 | 0.198 | 24.250 | 79 | | |
| 47 | 3.5 | Fresh | 0.289 | 0.177 | 24.491 | 78 | 6.34 | 0.1 |
| | | Steamed | 0.205 | 0.19 | 24.239 | 64 | | |
| 48 | 4.5 | Fresh | 0.283 | 0.218 | 24.499 | 74 | 6.85 | 0.1 |
| | | Steamed | 0.194 | 0.208 | 24.239 | 59 | | |

Figure 5:
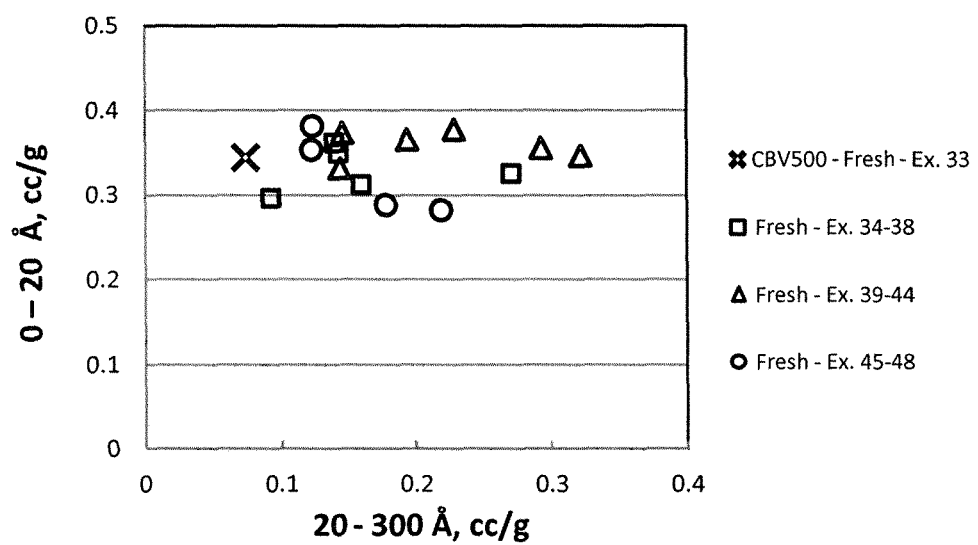
FIG. 5 is a graph comparing the mesopore volumes and micropore volumes for the pre-streamed (i.e., fresh) samples prepared in Examples 33-48.
Figure 6:
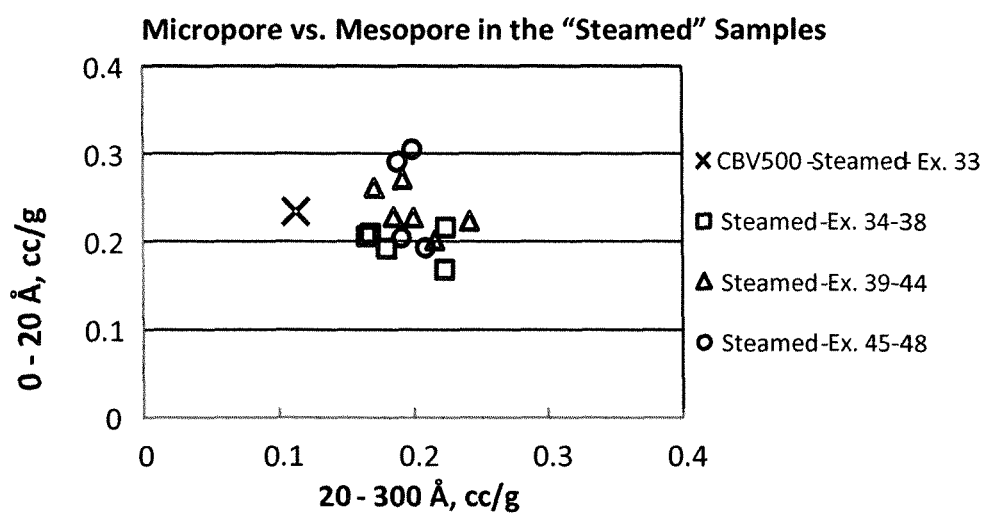
FIG. 6 is a graph of mesopore volume versus micropore volume for the steamed samples prepared in Examples 33-48.

The relationship between the micropore and mesopore volumes generated in Examples 34-48 are depicted in FIGS. 5 and 6, along with the properties of the fresh and steamed "benchmark" USY sample of Comparative Example 33. FIGS. 5 and 6 show that the applied procedures in Examples 34-48 introduced a significant amount of mesoporosity, while micropore volumes, despite some fluctuation, generally stayed the same in comparison to regular USY. Further, the mesopore volume advantage over regular USY is preserved after steaming.

Figure 7:
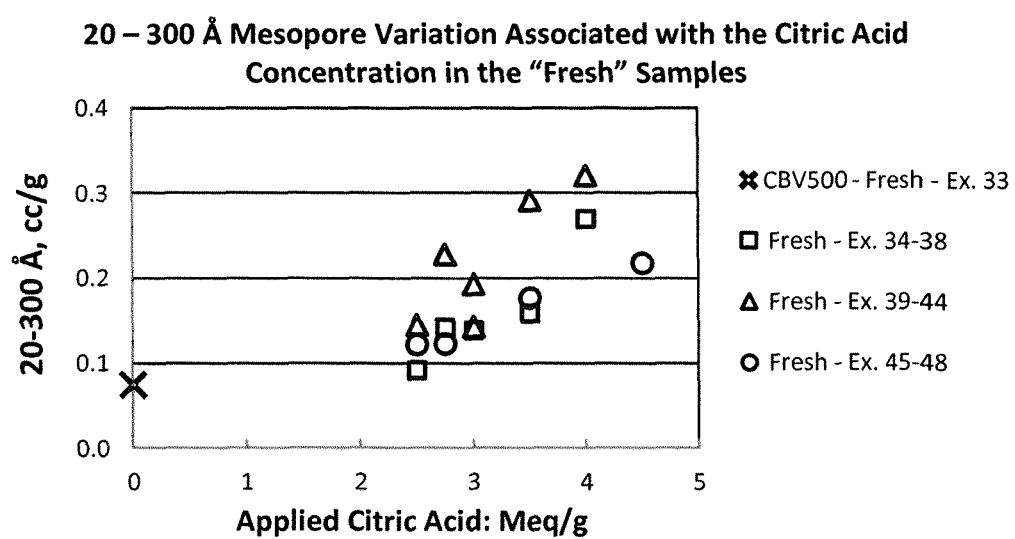
FIG. 7 is a graph depicting the effect of acid pretreatment severity on the mesopore volume of the pre-streamed (i.e., fresh) samples prepared in Examples 33-48.
Figure 8:
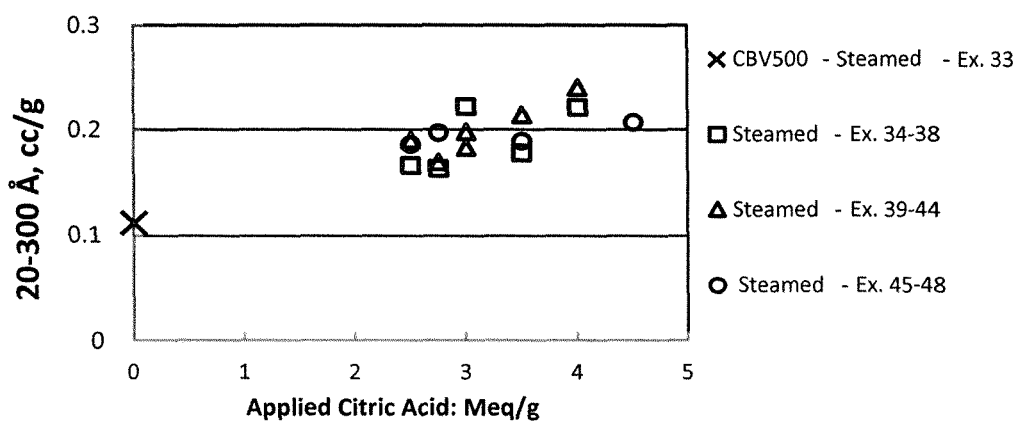
FIG. 8 is a graph depicting the effect of acid pretreatment severity on the mesopore volume of the steamed samples prepared in Examples 33-48.

The effect of acid pre-treatment severity is shown in FIGS. 7 and 8. The trend shows an increase in mesopore volume with increasing concentrations of citric acid.

Figure 9:
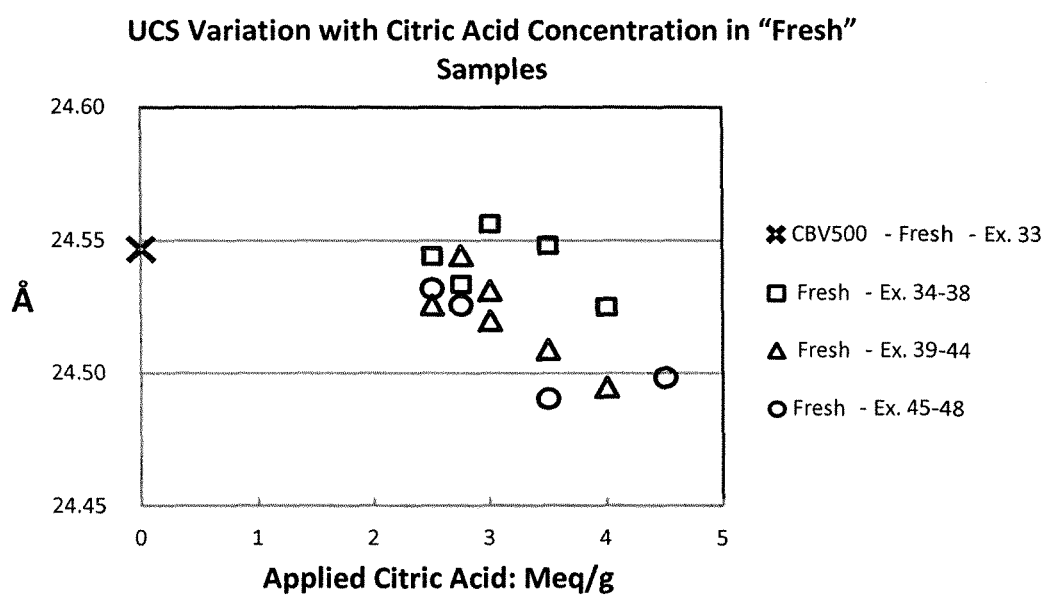
FIG. 9 is a graph depicting the effect of acid pretreatment severity on the UCS of the pre-streamed (i.e., fresh) samples prepared in Examples 33-48.
Figure 10:
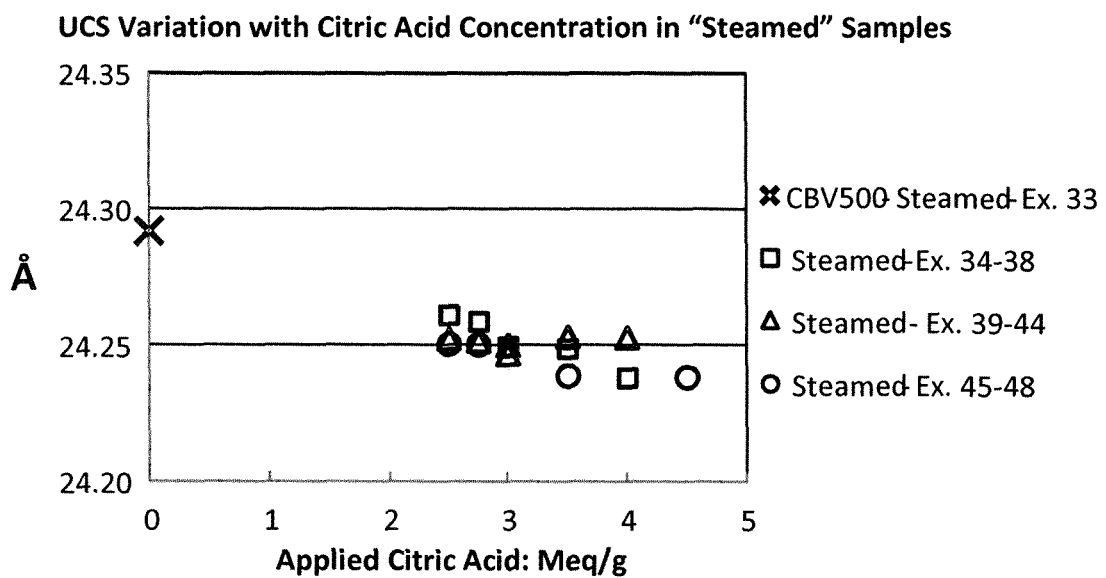
FIG. 10 is a graph depicting the effect of acid pretreatment severity on the UCS of the streamed samples prepared in Examples 33-48.

The acid treatment also affected the UCS of the produced mesoporous Y zeolites. FIGS. 9 and 10 show that the UCS progressively declined in the pre-steamed and steamed products. Thus, zeolitic materials of this process exhibit a lower UCS in generated mesoporous products relative to conventional USY.

Figure 11:
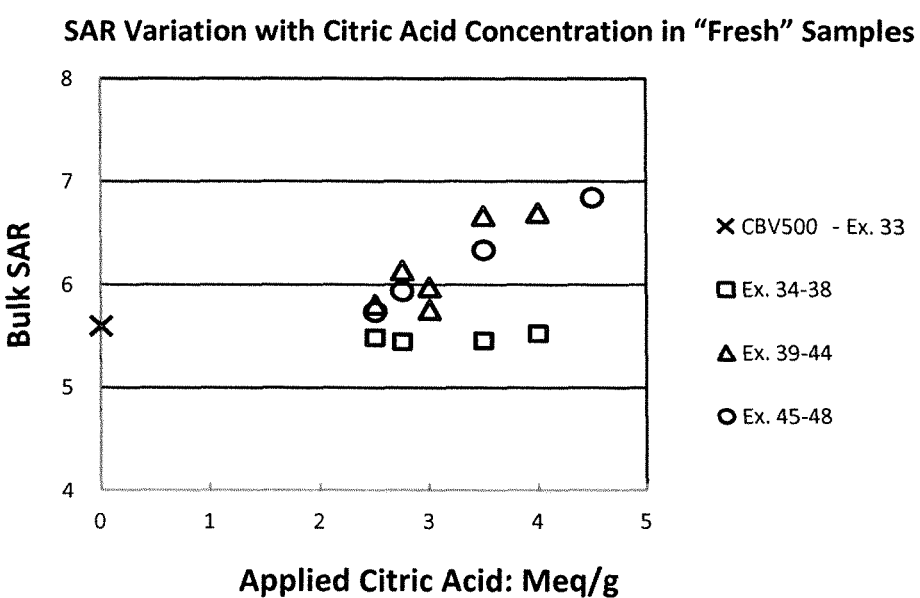
FIG. 11 is a graph depicting the effect of acid pretreatment severity on the bulk SAR of the pre-streamed (i.e., fresh) samples prepared in Examples 33-48.

The bulk SAR in the products is an outcome of two subsequent transformations. First, during the acid treatment stage, dealumination takes place and the bulk SAR increases. Next, the caustic treatment causes desilication and lowers the bulk SAR. FIG. 11 compares the bulk SAR values in Examples 33-48. In Examples 39-48, the effect of dealumination prevailed. In Examples 34-38, which contained higher NaOH/zeolite ratios, the transformations generally offset each other.

Examples 49 and 50 (Inventive)

Variation of CTAB Dosage

In this example, the amount of surfactant utilized was varied to determine its affect on various properties of the modified zeolite.

In Example 49, the sodium form of zeolite Y was used (CBV100) as the starting material. The CBV100 was diluted with deionized water to produce 20% zeolite slurries. The pH of the 20% zeolite slurries was then adjusted to 5.9 by drops of diluted sulfuric acid before adding a 10% citric acid solution corresponding to 3.5 meq/g. The 10% citric acid solution was slowly pumped at ambient temperature into the agitated slurries. After filtering and washing, the resulting cake was treated with a solution of 20 g CTAB (0.6 mmole/g) in 280 g of deionized water for 1 hour at 80° C. The cake was then separated from the mixture without washing and treated with 1,350 g of 0.1 m NaOH at 80° C. for another hour. The ratio of NaOH to one gram of nominal zeolite was 1.5 mmole/g.

After filtering and washing, the cake was subjected twice to ammonium exchange at 80° C. for 30 minutes in a solution of 100 g $NH_4SO_4$ and 600 g of deionized water. The pH of the modified zeolite slurry in the $NH_4^+$-solution was adjusted to 4 at the start of exchange by utilizing drops of 10% $HSO_4$. The modified zeolite was then subjected to the stabilization and steaming steps outlined in Examples 34-48. A post-calcination ammonium exchange was carried out by twice subjecting the modified zeolite to ammonium exchange at 80° C. for 30 minutes in a solution of 50 g $NH_4SO_4$ and 400 g of deionized water. The pH of the modified zeolite slurry in the $NH_4^+$-solution was adjusted to 4 at the start of exchange by utilizing drops of 10% $HNO_3$.

Example 50 was prepared in the same manner as Example 49, except significantly lower amounts of surfactant were used. In this example, the resulting cake was treated with 2 g CTAB (0.06 mmole/g).

The pore volume, UCS, crystallinity %, bulk SAR, and residual $Na_2O$ were measured according to the procedures outlined in Examples 1-5 and 33. The measured properties of Examples 49 and 50 are depicted in Table 8.

TABLE 8

| | Preparation | | Pore Volume, cc/g | | | XRD Characterization | | XRF Analyses | |
|---|---|---|---|---|---|---|---|---|---|
| | | | | | | Crystallinity % | | | |
| Prep # | CTAB, mmole/g | Stage | Micro-Pores: 0-20 Å | Meso-Pores: 20-300 Å | UCS, Å | (CBV500 base) | Bulk SAR | Na2O, % | |
| 49 | 0.6 | Fresh | 0.271 | 0.245 | 24.4737 | 71 | 6.17 | 0.2 | |
| | | Steamed | 0.165 | 0.275 | 24.2358 | 51 | | | |
| 50 | 0.06 | Fresh | 0.259 | 0.229 | 24.4668 | 71 | 6.26 | 0.20 | |
| | | Steamed | 0.16 | 0.221 | 24.2386 | 53 | | | |

Figure 12:
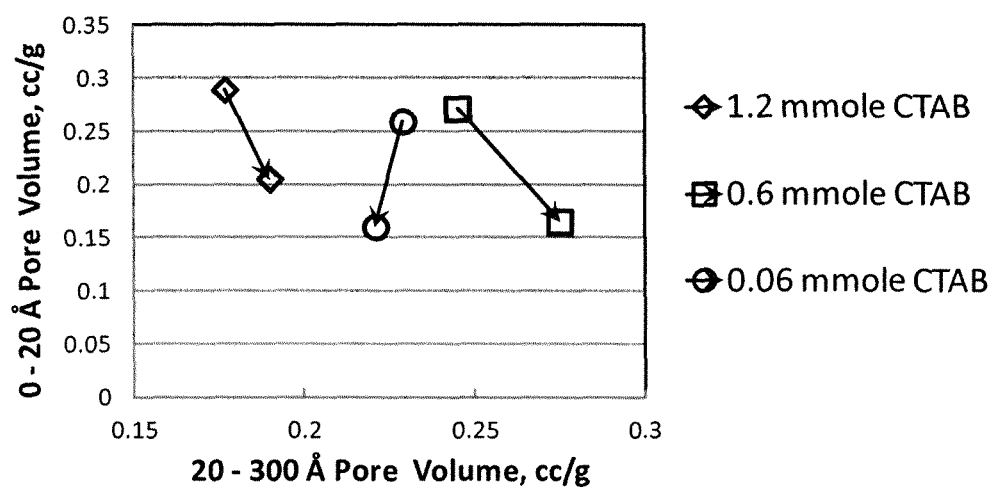
FIG. 12 is a graph depicting the effect of surfactant dosage on micropore and mesopore volumes in fresh and steamed samples in Examples 47-49.

Examples 49 and 50 had a NaOH/zeolite ratio of 1.5 mmole/g. These examples were compared to Example 47, which had a NaOH/zeolite ratio of 1.25 mmole/g. This comparison is provided in FIG. 12. FIG. 12 shows that a substantial decrease of the surfactant amount does not result in a consistent loss of mesoporosity.

Examples 51-53 (Inventive)

Stabilization of UCS in Rived Zeolites

Examples 51-53 were performed to analyze the stabilization of UCS loss during the riving procedure. Examples 51-53 were prepared with different degrees of acid pretreatment severity: 2.5 meq/g (Example 51), 2.75 meq/g (Example 52), and 3.5 meq/g of citric acid (Example 53).

Examples 51-53 show that the insertion of a rare-earth exchange step into the riving procedure can effectively eliminate the lowering of the UCS in generated mesoporous products.

In Example 51, the resulting cake after acid pretreatment was treated with a solution of 124 g of 29% solution of cetyl trimethyl ammonium chloride ("CTAC") and 216 g of deionized water at 80° C. for 1 hour. The CTA mmole/g ratio was 1.2.

In Examples 52 and 53, the resulting cake after acid pretreatment was treated with 40 g CTAB and 300 g of deionized water at 80° C. for 1 hour. The ratios of CTA to zeolite stayed about the same as in Example 51.

After surfactant treatment, the resulting surfactant-treated cakes in Examples 51-53 were not washed and subjected to caustic treatment. The cake for each preparation was suspended in 500 g of water solution that contained 9.6 g of NaOH. The ratio of NaOH per g of nominal zeolite was 3 mmole/g. The caustic treatment was done at 80° C. for 2 hours at agitation and 18 hours without agitation.

After filtration and washing, the wet vacuum-filtered cakes were then treated once with 70 g of $NH_4NO_3$ solution in 530 g of deionized water at 80° C. for 30 minutes. The resulting cakes were then subjected to La ion-exchange. Due to several separation steps prior to this stage, the treated cake only contained 60% of modified products of the original zeolite. During La ion-exchange, a La-nitrate solution containing 0.3 mole of $La(NO_3)_3$ in 1 kg of the solution was prepared from lanthanum nitrate hexahydrate from Advanced Material Resources. About 105 g of the 0.3 m solution was added to 600 g of deionized water. The cake was suspended in the solution and agitated at 80° C. for two hours.

The treated products were then subjected to calcinations after being filtered, washed, and dried. Subsequent to calcination, the products were subjected to ammonium exchange and steaming under the conditions outlined in Examples 34-38.

The pore volume, UCS, crystallinity %, bulk SAR, and residual $Na_2O$ were measured according to the procedures outlined in Examples 1-5 and 33. The measured properties of Examples 51-53 are depicted in Table 9 along with the data for Examples 34, 35, and 37, which were produced with similar parameters as Examples 51-53, but did not utilize a La exchange step. This comparison in Table 9 shows that most of the properties, except UCS, are reasonably close. The UCS grows with La incorporation and can be controlled by insertion of a La-exchange step into riving process. Thus, Examples 51-53 show that the insertion of a rare-earth exchange step into the riving procedure can effectively eliminate the lowering of the UCS in generated mesoporous products.

TABLE 9

| | Preparation | | | | Pore Volume, cc/g | | | XRF Analyses | | |
|---|---|---|---|---|---|---|---|---|---|---|
| Prep # | Citric Acid Meq/g | Surfactant, mmole/g | NaOH, mmole/g | Stage | Micro-Pores: 0-20 Å | Meso-Pores: 20-300 Å | UCS, Å | Bulk SAR | La2O3, % | Na2O, % |
| 51 | 2.5 | CTAC, 1.2 | 3 | Fresh | 0.364 | 0.112 | 24.643 | 5.17 | 9.1 | 0.3 |
| | | | | Steamed | 0.225 | 0.15 | 23.386 | | | |
| 34 | 2.5 | CTAB, 1.2 | 2.8 | Fresh | 0.297 | 0.092 | 24.544 | 5.53 | 0 | 0.1 |
| | | | | Steamed | 0.21 | 0.167 | 24.261 | | | |
| 52 | 2.75 | CTAB, 1.2 | 3 | Fresh | 0.385 | 0.138 | 24.650 | 5.23 | 9.7 | 0.2 |
| | | | | Steamed | 0.238 | 0.137 | 23.389 | | | |
| 35 | 2.75 | CTAB, 1.2 | 2.8 | Fresh | 0.35 | 0.142 | 24.534 | 5.49 | 0 | 0.1 |
| | | | | Steamed | 0.207 | 0.164 | 24.259 | | | |
| 53 | 3.5 | CTAB, 1.2 | 3 | Fresh | 0.311 | 0.166 | 24.633 | 5.38 | 9.7 | 0.2 |
| | | | | Steamed | 0.186 | 0.178 | 24.389 | | | |
| 37 | 3.5 | CTAB, 1.2 | 2.8 | Fresh | 0.313 | 0.159 | 24.548 | 5.45 | 0 | 0.2 |
| | | | | Steamed | 0.193 | 0.179 | 24.249 | | | |

SELECTED DEFINITIONS

It should be understood that the following is not intended to be an exclusive list of defined terms. Other definitions may be provided in the foregoing description accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

Unless otherwise indicated, the term "mesoporous" is art-recognized and refers to a porous material comprising pores with an intermediate size, ranging anywhere from about 2 to about 50 nanometers.

The term "riving" as used herein refers to the process of incorporating mesoporosity into a zeolitic material.

The term "mesostructure" is art-recognized and refers to a structure comprising mesopores which control the architecture of the material at the mesoscopic or nanometer scale, including ordered and non-ordered mesostructured materials, as well as nanostructured materials, i.e., materials in which at least one of their dimensions is in the nanometer size range, such as nanotubes, nanorings, nanorods, nanowires, nano-slabs, and the like.

The term "zeolite" is defined as in the International Zeolite Association Constitution (Section 1.3) to include both natural and synthetic zeolites as well as molecular sieves and other microporous and mesoporous materials having related properties and/or structures. The term "zeolite" also refers to a group, or any member of a group, of structured aluminosilicate minerals comprising cations such as sodium and calcium or, less commonly, barium, beryllium, lithium, potassium, magnesium and strontium; characterized by the ratio (Al+Si):O=approximately 1:2, an open tetrahedral framework structure capable of ion exchange, and loosely held water molecules that allow reversible dehydration. The term "zeolite" also includes "zeolite-related materials" or "zeotypes" which are prepared by replacing $Si^{4+}$ or $Al^{3+}$ with other elements as in the case of aluminophosphates (e.g., MeAPO, SAPO, ElAPO, MeAPSO, and ElAPSO), gallophosphates, zincophophates, and titanosilicates.

What is claimed is:

1. A method of forming a material comprising a mesoporous zeolitic material having long-range crystallinity, said method comprising:

(a) contacting an initial zeolitic material having long-range crystallinity with an acid to thereby form an acid-treated zeolitic material having long-range crystallinity, wherein said initial zeolitic material comprises zeolite A, faujasites, mordenite, CHA, ZSM-5, ZSM-12, ZSM-22, beta zeolite, synthetic ferrierite, synthetic mordenite, or mixtures thereof;

(b) contacting said acid-treated zeolitic material having long-range crystallinity with a surfactant to thereby form a first treatment mixture comprising said surfactant and an intermediate surfactant-treated material;

(c) recovering at least a portion of said intermediate surfactant-treated material from said first treatment mixture thereby forming an at least partially isolated intermediate surfactant-treated material; and (d) contacting said at least partially isolated intermediate surfactant-treated material with a base thereby forming said mesoporous zeolitic material having long-range crystallinity.

2. The method of claim 1, wherein said mesoporous zeolitic material having long-range crystallinity has a total 20 to 135 Å diameter mesopore volume of at least 0.1 cc/g.

3. The method of claim 1, wherein said mesoporous zeolitic material having long-range crystallinity has a crystalline content of at least 40 weight percent as measured by X-ray diffraction ("XRD").

4. The method of claim 3, wherein said mesoporous zeolitic material having long-range crystallinity exhibits said crystalline content after steaming at 1,450° F. for 8 hours with 100% steam.

5. The method of claim 1, wherein said mesoporous zeolitic material having long-range crystallinity has a total 20 to 135 Å diameter mesopore volume that is at least 0.05 cc/g greater than the 20 to 135 Å diameter mesopore volume of said initial zeolitic material having long-range crystallinity.

6. The method of claim 1, wherein said mesoporous zeolitic material having long-range crystallinity is a mesostructured zeolite.

7. The method of claim 1, wherein said mesoporous zeolitic material having long-range crystallinity has a total 0 to 20 Å diameter micropore volume in the range of from about 0.12 to about 0.25 cc/g.

8. The method of claim 1, wherein said initial zeolitic material having long-range crystallinity is a zeolite.

9. The method of claim 1, wherein said acid is present in an initial amount in the range of from about 0.5 to about 6 milliequivalents per gram of said initial zeolitic material having long-range crystallinity.

10. The method of claim 1, wherein said acid is selected from the group consisting of hydrochloric acid, sulfuric acid, nitric acid, acetic acid, sulfonic acid, oxalic acid, citric acid, ethylenediaminetetraacetic acid, tartaric acid, malic acid, glutaric acid, succinic acid, and mixtures of two or more thereof.

11. The method of claim 1, wherein said first treatment mixture comprises at least a portion of said acid, wherein said first treatment mixture has a pH in the range of from about 2 to about 6.

12. The method of claim 1, wherein said surfactant is selected from the group consisting of cetyltrimethylammonium bromide, cetyltrimethylammonium chloride, and mixtures thereof.

13. The method of claim 1, wherein said base is selected from the group consisting of NaOH, $NH_4OH$, KOH, $Na_2CO_3$, TMAOH, and mixtures of two or more thereof.

14. The method of claim 1, wherein said base is present in a ratio with the initial quantity of said initial zeolitic material in the range of from about 0.5 to 4 mmol per gram of initial zeolitic material.

15. The method of claim 1, wherein said at least partially isolated intermediate surfactant-treated material comprises a cation of said surfactant in an amount in the range of from about 1 to about 30 weight percent.

16. A method of forming a material comprising a mesoporous zeolite, said method comprising:
   (a) combining an initial zeolite with an acid and a surfactant to thereby form a treated zeolite, wherein said initial zeolite comprises zeolite A, faujasites, mordenite, CHA, ZSM-5, ZSM-12, ZSM-22, beta zeolite, synthetic ferrierite, synthetic mordenite, or mixtures thereof;
   (b) recovering at least a portion of said treated zeolite to thereby form an at least partially isolated intermediate treated zeolite; and
   (c) contacting said at least partially isolated intermediate treated zeolite with a base to thereby form said mesoporous zeolite.

17. The method of claim 16, wherein said mesoporous zeolite has a total 20 to 135 Å diameter mesopore volume of at least 0.1 cc/g.

18. The method of claim 16, wherein said mesoporous zeolite has a total 20 to 135 Å diameter mesopore volume in the range of from about 0.05 to about 0.35 cc/g, wherein said mesoporous zeolite exhibits said 20 to 135 Å diameter mesopore volume after steaming at 1,450° F. for 8 hours with 100% steam.

19. The method of claim 16, wherein said mesoporous zeolite has a crystalline content of at least 50 weight percent as measured by X-ray diffraction ("XRD"), wherein said mesoporous zeolite exhibits said crystalline content after steaming at 1,450° F. for 8 hours with 100% steam.

20. The method of claim 16, wherein said mesoporous zeolite has a total 20 to 135 Å diameter mesopore volume that is at least 0.04 cc/g greater than the 20 to 135 Å diameter mesopore volume of said initial zeolite.

21. The method of claim 16, wherein said mesoporous zeolite is a mesostructured zeolite.

22. The method of claim 16, wherein said mesoporous zeolite has a total 0 to 20 Å diameter micropore volume in the range of from about 0.12 to about 0.25 cc/g, wherein said mesoporous zeolite exhibits said 0 to 20 Å diameter micropore volume after steaming at 1,450° F. for 8 hours with 100% steam.

23. The method of claim 16, wherein said initial zeolite comprises a zeolite Y selected from the group consisting of USY, $NH_4Y$, NaY, a rare earth ion zeolite Y, or mixtures thereof.

24. The method of claim 16, wherein said acid is selected from the group consisting of hydrochloric acid, sulfuric acid, nitric acid, acetic acid, sulfonic acid, oxalic acid, citric acid, ethylenediaminetetraacetic acid, tartaric acid, malic acid, glutaric acid, succinic acid, and mixtures of two or more thereof.

25. The method of claim 16, wherein said acid is present in an initial amount in the range of from about 0.5 to about 6 milliequivalents per gram of initial zeolite.

26. The method of claim 16, wherein said base is selected from the group consisting of NaOH, $NH_4OH$, KOH, $Na_2CO_3$, TMAOH, and mixtures of two or more thereof.

27. The method of claim 16, wherein said base is present in a ratio with the initial quantity of said initial zeolite in the range of from about 0.5 to 4 mmol per gram of initial zeolite.

28. The method of claim 16, wherein said material comprises a composite material, wherein said composite material comprises at least one binder.

29. The method of claim 16, wherein said surfactant is selected from the group consisting of cetyltrimethylammonium bromide, cetyltrimethylammonium chloride, and mixtures thereof.

30. The method of claim 1, wherein said contacting of step (a) occurs in the substantial absence of hydrofluoric acid.

31. The method of claim 16, wherein said combining of step (a) occurs in the substantial absence of hydrofluoric acid.

* * * * *